US009256662B2

(12) United States Patent
D'Angelo et al.

(10) Patent No.: US 9,256,662 B2
(45) Date of Patent: Feb. 9, 2016

(54) TECHNIQUES FOR PUBLISHING VIEWERS OF CONTENT

(71) Applicants: Adam Edward D'Angelo, Palo Alto, CA (US); Rebekah Marie Cox, Mountain View, CA (US); Sandra Liu Huang, Menlo Park, CA (US); Joel Oren Lewenstein, San Francisco, CA (US); Tudor Stefan Achim, Palo Alto, CA (US)

(72) Inventors: Adam Edward D'Angelo, Palo Alto, CA (US); Rebekah Marie Cox, Mountain View, CA (US); Sandra Liu Huang, Menlo Park, CA (US); Joel Oren Lewenstein, San Francisco, CA (US); Tudor Stefan Achim, Palo Alto, CA (US)

(73) Assignee: Quora, Inc., Mountain View, CA (US)

( * ) Notice: Subject to any disclaimer, the term of this patent is extended or adjusted under 35 U.S.C. 154(b) by 361 days.

(21) Appl. No.: 13/833,908

(22) Filed: Mar. 15, 2013

(65) Prior Publication Data

US 2014/0281890 A1    Sep. 18, 2014

(51) Int. Cl.
G06F 17/00    (2006.01)
G06F 17/30    (2006.01)
G06F 17/22    (2006.01)

(52) U.S. Cl.
CPC ...... *G06F 17/30598* (2013.01); *G06F 17/2247* (2013.01)

(58) Field of Classification Search
CPC .................................................. G06F 17/2247
See application file for complete search history.

(56) References Cited

U.S. PATENT DOCUMENTS

| 2010/0318611 | A1* | 12/2010 | Curtin et al. | 709/206 |
| 2013/0046855 | A1* | 2/2013 | Jiang et al. | 709/218 |
| 2013/0166725 | A1* | 6/2013 | Liyanage et al. | 709/224 |

* cited by examiner

*Primary Examiner* — Keith Bloomquist
(74) *Attorney, Agent, or Firm* — Schwegman Lundberg & Woessner, P.A.

(57) ABSTRACT

According to various embodiments, a viewing event may be detected, the viewing event corresponding to a user viewing a content item. A view reason associated with the viewing event may be determined, the view reason indicating how the user was notified of the content item or how the user accessed the content item. A privacy value associated with the viewing event may be determined, the privacy value indicating an inferred sensitivity of the user to publication of the viewing event. Further, metadata describing the viewing event may be generated. Moreover, the metadata may be associated with the content item.

18 Claims, 26 Drawing Sheets

Search Questions, Topics, People, and Blogs

SELF-TEACHING  SAILING  BOATS

How Hard Is It To Lean To Sail? —401
Add Question Details
Comment – Share – Options

—404

FOLLOW QUESTION

Promote Question to 100 People

100 Credits to Promote —406

2 ANSWERS                                              Ask to Answer

John Smith   Add Bio – Make Anonymous

Add your answer...
—405

RELATED QUESTIONS

Sailing: How challenging is it to sail from San Francisco to Seattle?

Sailing: What are the best online resources for learning how to sail?

See more related questions

Sandra Liu Huang
1 vote by Greg Johnson
It's not so hard because... —402

Comment – Share – Embed – Thank – 9 Feb, 2013

SHARE QUESTION

SN  Social    In  Inbox    E  Email
    Network

Question Stats
Latest Activity: 4:25 PM
This questions has 106526 topic followers
1436 people have viewed this question
13 people are following this question Tudor Achim
1 vote by Steve Klein
Sailing, like any activity, takes time and patience to learn... —403

Comment – Share – Embed – Thank – 18 Sep, 2012

```
┌─────────────────────────────────────────────────────────────┐
│  ┌───────────────────────────────────────────────┐          │
│  │  Search Questions, Topics, People, and Blogs  │          │
│  └───────────────────────────────────────────────┘          │
│   Top Stories    Most Recent                                │
│   ═══════════════════════════════════════════════════════   │
│   ┌──┐  Joel Lewenstein followed a question                 │
│   │👤│     Sailing: How hard is it to learn to sail? ──601  │
│   └──┘  ─────────────────────────────────────────────────   │
│   ┌──┐  Joel Lewenstein promoted a question                 │
│   │👤│     Movies: Which movie is your favorite?            │
│   └──┘  ─────────────────────────────────────────────────   │
│   ┌──┐  Joel Lewenstein voted up an answer                  │
│   │👤│     Outer Space: Can you cry in space?               │
│   └──┘        Adam D'Angelo: Yes, but you...                │
│         ─────────────────────────────────────────────────   │
│   ┌──┐  Joel Lewenstein followed a topic: Rock Music        │
│   │👤│                                                      │
│   └──┘  ─────────────────────────────────────────────────   │
│   ┌──┐  Joel Lewenstein added an answer                     │
│   │👤│     Earth: Why is there air around the earth?        │
│   └──┘       "Well, the main reason is...."                 │
│         ─────────────────────────────────────────────────   │
│   ┌──┐  Joel Lewenstein added a question                    │
│   │👤│   Architecture: Which are some of the most posh offices to work in? │
│   └──┘  ─────────────────────────────────────────────────   │
│   ┌──┐  Question added to the topic Food                    │
│   │ T│     What is the weirdest looking fruit? ──602        │
│   └──┘  ─────────────────────────────────────────────────   │
│   ┌──┐  Question promoted in the topic Food                 │
│   │ T│     What is the best tasting vegetable?              │
│   └──┘  ─────────────────────────────────────────────────   │
│   ┌──┐  Answer added to the topic Food                      │
│   │ T│     What are good ways to cook whole trout?          │
│   └──┘        Adam D'Angelo: The best way is to...          │
│         ─────────────────────────────────────────────────   │
│   ┌──┐  Sandra Liu Huang promoted the question              │
│   │ Q│     Music: who are the best living classical pianists? │
│   └──┘  ─────────────────────────────────────────────────   │
│   ┌──┐  Answer added to the question                        │
│   │ Q│     Music: who are the best living classical pianists? │
│   └──┘        "Hard to choose...."                          │
│         ─────────────────────────────────────────────────   │
│   ┌──┐  Adam D'Angelo voted up an answer to the question    │
│   │ Q│     Music: who are the best classical pianists?      │
│   └──┘        "My list includes...."                        │
│                                                             │
│         ┌─────────────────────────────────────────┐         │
│         │                   More                  │         │
│         └─────────────────────────────────────────┘         │
└─────────────────────────────────────────────────────────────┘
```

*Fig. 6*

Search Questions, Topics, People, and Blogs

Joel Lewenstein (Unfollow) —901

Joel Lewenstein followed a question
Sailing: How hard is it to learn to sail?

Joel Lewenstein promoted a question
Movies: Which movie is your favorite?

Joel Lewenstein voted up an answer
Outer Space: Can you cry in space?
Adam D'Angelo: Yes, but you...

Joel Lewenstein followed a topic: Rock Music

Joel Lewenstein added an answer
Earth: Why is there air around the earth?
"Well, the main reason is...."

Joel Lewenstein added a question
Architecture: Which are some of the most posh offices to work in?

More

*Fig. 9*

┌─────────────────────────────────────────────────────────┐
│  ┌───────────────────────────────────────────────┐      │
│  │ Search Questions, Topics, People, and Blogs   │      │
│  └───────────────────────────────────────────────┘      │
│                                                          │
│  Adam D'Angelo                         ( Follow )  ←1001 │
│  ──────────────────────────────────────────────────────  │
│   ☺  Adam D'Angelo followed a question               │
│        Cats (pets): How much work is it to care for a cat? │
│                                                          │
│   ☺  Adam D'Angelo promoted a question               │
│        What are the most iconic pictures of CalTech?     │
│                                                          │
│   ☺  Adam D'Angelo voted up an answer                │
│        San Francisco Bay: How deep is the San Francisco Bay? │
│        Don van der Drift: The average depth is 7.69m...  │
│                                                          │
│   ☺  Adam D'Angelo followed a topic: Computer Programming │
│                                                          │
│   ☺  Adam D'Angelo added an answer                   │
│        Economic History: What caused migration to suburbs in 1950s? │
│        "There are many key things that...."              │
│                                                          │
│   ☺  Adam D'Angelo added a question                  │
│        Medicine and Healthcare: Do doctors visit other doctors when they fall ill? │
│                                                          │
│           ┌──────────────────────────────┐               │
│           │            More              │               │
│           └──────────────────────────────┘               │
└─────────────────────────────────────────────────────────┘

*Fig. 10*

| | PUBLIC (Privacy Value = Low) | PRIVATE (Privacy Value = High) |
|---|---|---|
| Content Keywords | *All others* | Healthcare, Romance, Adult |
| Topics | *All others* | Healthcare, Romance, Adult |
| Channels | Email weekly digest<br>Content feed | Notifications |
| Link from a webpage | Content Feed<br>Topic-specific page (for topics followed by user) | *All others* |
| Interaction Events | Follow question<br>Vote up answer to question<br>Vote down answer to question<br>Add question<br>Add answer to question | *All others* |

| | |
|---|---|
| VIEWING DATE/TIME | 13:00 3/1/13 |
| LOCATION (IP) | 12.345.678.12 |
| LOCATION | San Francisco, CA |
| NAME | John Smith |
| PROFILE LINK | http://www.quora.com/John-Smith |
| CONTENT ITEM | http://www.quora.com/How-hard-is-it-to-learn-to-sail |
| VIEW REASON | via Joel Lewenstein |
| PRIVACY VALUE | Low |

┌─ 1302

| | |
|---|---|
| VIEWING DATE/TIME | 13:04 3/1/13 |
| LOCATION (IP) | 12.345.678.12 |
| LOCATION | San Francisco, CA |
| NAME | John Smith |
| PROFILE LINK | http://www.quora.com/John-Smith |
| CONTENT ITEM | http://www.quora.com/What-is-the-weirdest-fruit |
| VIEW REASON | via Food |
| PRIVACY VALUE | Low |

┌─ 1303

| | |
|---|---|
| VIEWING DATE/TIME | 13:10 3/1/13 |
| LOCATION (IP) | 12.345.678.12 |
| LOCATION | San Francisco, CA |
| NAME | John Smith |
| PROFILE LINK | http://www.quora.com/John-Smith |
| CONTENT ITEM | http://www.quora.com/Best-living-classical-pianists |
| VIEW REASON | via Weekly Digest |
| PRIVACY VALUE | Low |

┌─ 1304

| | |
|---|---|
| VIEWING DATE/TIME | 13:07 3/1/13 |
| LOCATION (IP) | 12.345.678.12 |
| LOCATION | San Francisco, CA |
| NAME | John Smith |
| PROFILE LINK | http://www.quora.com/John-Smith |
| CONTENT ITEM | http://www.quora.com/Best-living-classical-pianists |
| VIEW REASON | via the Question |
| PRIVACY VALUE | Low |

*Fig. 13*

| | | 1401 |
|---|---|---|
| VIEWING DATE/TIME | 13:12 3/1/13 | |
| LOCATION (IP) | 12.345.678.12 | |
| LOCATION | San Francisco, CA | |
| NAME | John Smith | |
| PROFILE LINK | http://www.quora.com/John-Smith | |
| CONTENT ITEM | http://www.quora.com/... | |
| VIEW REASON | via Notification | |
| PRIVACY VALUE | High | |

| | | 1402 |
|---|---|---|
| VIEWING DATE/TIME | 13:12 3/1/13 | |
| LOCATION (IP) | 12.345.678.12 | |
| LOCATION | San Francisco, CA | |
| NAME | John Smith | |
| PROFILE LINK | http://www.quora.com/John-Smith | |
| CONTENT ITEM | http://www.quora.com/... | |
| VIEW REASON | via Direct URL Entry | |
| PRIVACY VALUE | High | |

| | | 1403 |
|---|---|---|
| VIEWING DATE/TIME | 13:12 3/1/13 | |
| LOCATION (IP) | 12.345.678.12 | |
| LOCATION | San Francisco, CA | |
| NAME | John Smith | |
| PROFILE LINK | http://www.quora.com/John-Smith | |
| CONTENT ITEM | http://www.quora.com/... | |
| VIEW REASON | via Browsing Links | |
| PRIVACY VALUE | High | |

| | | 1404 |
|---|---|---|
| VIEWING DATE/TIME | 13:12 3/1/13 | |
| LOCATION (IP) | 12.345.678.12 | |
| LOCATION | San Francisco, CA | |
| NAME | John Smith | |
| PROFILE LINK | http://www.quora.com/John-Smith | |
| CONTENT ITEM | http://www.quora.com/... | |
| VIEW REASON | via Search Results | |
| PRIVACY VALUE | High | |

*Fig. 14*

| VIEWING DATE/TIME | 13:00 3/1/13 |
|---|---|
| LOCATION (IP) | 12.345.678.12 |
| LOCATION | Framingham, MA |
| NAME | N/A |
| PROFILE LINK | N/A |
| CONTENT ITEM | http://www.quora.com/How-hard-is-it-to-learn-to-sail |
| VIEW REASON | N/A |

Search Questions, Topics, People, and Blogs

Views On Your Content

Recent Views —1901

Spence Chan
What is the average commute time in the San Francisco Bay Area?
Via Sandra Liu Huang - Mon

Kah Hong Tay
How do the various tablets compare?
Via Tablets - Sun

Joel Lewenstein
How do the various tablets compare?
Via Weekly Digest - Sat

164 Views Today

19 on The Quora Blog
11 on How restorative...
7 on Where can I buy...
5 on What can be done..
4 on What is Math?
4 on What is the average commute?
4 on How do the various tablets compare?

February 2013  5668 Views —1902

Adam D'Angelo
Quora Product Updates
Via Sandra Liu Huang – Feb 11

Rebekah Cox
A Parenting Path
Via Parenting - Feb 13

Edmond Lau
Are little stickers on fruits compostable?
Via Fruits - Feb 13

Charlie Cheever
Are little stickers on fruits compostable?
Via the Question - Feb 14

Joel Lewenstein
Quora Product Updates
Via Tudor Achim - Feb 15

Kah Seng Tay
How do the various tablets compare?
Via Weekly Digest - Feb 16

TECHNIQUES FOR PUBLISHING VIEWERS OF CONTENT

TECHNICAL FIELD

The present application relates generally to data processing techniques and, in one specific example, to techniques for publishing various information about viewers of content.

BACKGROUND

Many network-based applications and services that are currently in use or in development (including network-based question-and-answer applications and services) have a social aspect. For example, users of these applications are encouraged to establish connections with other users, or follow other users, for the purpose of forming virtual communities or forums via which the users can interact with one another and exchange information. Similarly, users of these applications may be encouraged to follow certain content sources, or subscribe to receive information relating to certain topics, answers to certain questions, and so forth. Many of these network-based applications and services rely partially, and in some cases almost entirely, on user-generated content—that is, content generated by the end-users of the particular application or service. The value of such applications and services to the users, and thus the success of any organization providing such applications and services, is heavily dependent upon the ability to attract and retain users who are willing to participate, for example, by consuming content, and/or interacting with other users by generating desirable, quality content that is to be shared with others.

BRIEF DESCRIPTION OF THE DRAWINGS

Some embodiments are illustrated by way of example and not limitation in the figures of the accompanying drawings in which:

FIG. 4 illustrates an exemplary portion of a user interface that displays a content item, according to various embodiments.

FIG. 6 illustrates an exemplary portion of a user interface that displays a content feed, according to various embodiments.

FIG. 9 illustrates an exemplary portion of a user interface that displays a user profile, according to various embodiments.

FIG. 10 illustrates an exemplary portion of a user interface that displays a user profile, according to various embodiments.

FIG. 11 illustrates exemplary privacy policy information, according to various embodiments.

FIG. 13 illustrates exemplary metadata, according to various embodiments.

FIG. 14 illustrates exemplary metadata, according to various embodiments.

FIG. 19 illustrates an exemplary portion of a user interface that displays a viewership summary, according to various embodiments.

DETAILED DESCRIPTION

Figure 1:
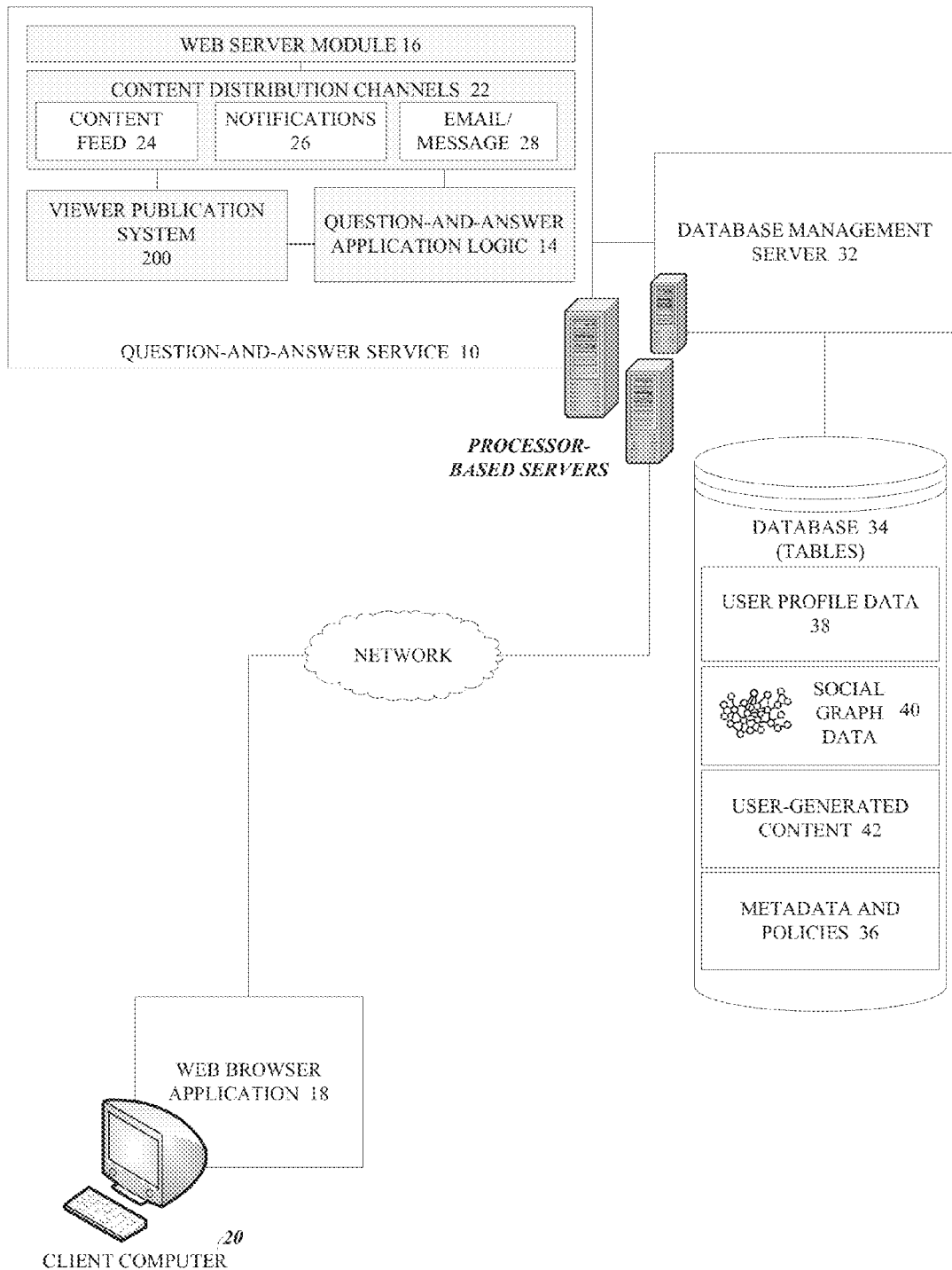
FIG. 1 is a network diagram depicting a client-server system, within which one example embodiment may be deployed.

Example methods and systems for publishing various information about viewers of content are described. In the following description, for purposes of explanation, numerous specific details are set forth in order to provide a thorough understanding of example embodiments. It will be evident, however, to one skilled in the art that the present invention may be practiced without these specific details.

As described in various embodiments herein, a viewer publication system is configured to generate, aggregate, and publish various information about viewers of content items. Consistent with some embodiments, a content item may correspond to a question content item or an answer content item posted on a question-and-answer service such as Quora.com, which is owned and operated by Quora, Inc. of Mountain View, Calif. According to various exemplary embodiments, when a content author posts a question on a question-and-answer service, the viewer publication system may publish the identities of the viewers of the content item, and describe how those viewers came upon that particular content item. Thus, the content author is able to understand who in the community is viewing their content, and how those members of the community reached that content (e.g., what led those members to see the content, how did it come to their attention, etc.). Accordingly, instead of simply notifying the content author of how many views their content item has received, the viewer publication system provides a unique and informative type of feedback for the content author.

At the same time, the publication of information about viewers of content items must be carefully balanced against the need to protect the privacy of such viewers. Thus, according to various exemplary embodiments, the publication of information about viewers of content items may be controlled in accordance with various privacy control systems of a viewer publication system described herein. For example, according to various embodiments described herein, a viewer publication system is configured to detect when a user is viewing a particular content item, such as a question posted on the question-and-answer service. Thereafter, the viewer publication system may determine a privacy value associated with the viewing event, such as a privacy value of "low" or "high". The aforementioned privacy value indicates how private the viewing event was, from the perspective of the viewing user, and/or an inferred sensitivity of the viewing user to publication of the viewing event. Put another way, the privacy value indicates whether a publication of the viewing event could be considered by that viewer user as disclosure of private information about the viewing user.

According to various embodiments described herein, a viewer publication system is configured to detect when a user is viewing a particular content item, such as a question posted on the question-and-answer service. Thereafter, the viewer publication system determines view reason information describing, for example, how the user accessed the viewed content item, how the user was notified of the content item, how the content item came to the user's attention, what led the user to view the content item, etc.

According to various exemplary embodiments, the viewer publication system may generate metadata describing each viewing event. The metadata for a given viewing event may describe, for example, a viewing date/time, a location (IP address) of a device having a web browser through which the content item was viewed, a location (city, state, country etc.) corresponding to the aforementioned IP address, a name of the viewing user, a link to the profile of the viewing user, and a link to the content item viewed. According to various exemplary embodiments, the metadata may also include privacy values associated with the viewing event. According to various exemplary embodiments, the metadata may also include view reason information describing, for example, how the user accessed the viewed content item, how the user was notified of the content item, how the content item came to the user's attention, what led the user to view the content item, etc.

According to various exemplary embodiments, the viewer publication system may aggregate all metadata describing viewing events corresponding to a particular content item, and associate this aggregated metadata with the content item. Thereafter, the viewer publication system may display a "views" page that may be linked to the content item and that may list viewers of the content item. The views page may also describe how the identified viewers came upon that particular content item. According to various exemplary embodiments, some of the viewers and/or view reasons may be fully identified while other viewers and/or view reasons may be anonymized, based on the privacy values or view reasons associated with each viewer's interaction with the underlying content item.

FIG. 1 is block diagram illustrating some of the functional modules and system components used in implementing a question-and-answer service 10 having a viewer publication system 200 for publishing various information about viewers of content in accordance with any of the aforementioned techniques and consistent with various embodiments of the invention. As illustrated in FIG. 1, a question-and-answer service 10 is implemented as a web-based application having application logic 14 residing at one or more processor-based computer servers. At least some of the servers include a web server component or module 16 for serving data (e.g., documents or web pages) to a conventional web browser application 18 residing and executing at a client computer 20. In addition, or as an alternative, the web server module 16 may utilize one or more web-based protocols to serve content to non-web browser clients, such as a web-based mobile application residing and executing on a mobile computing device, a set-top box, a television, or some other computing device.

As is understood by skilled artisans in the relevant computer and Internet-related arts, each module or logic component shown in FIG. 1 represents a set of executable software instructions and the corresponding hardware (e.g., memory and processor(s)) for executing the instructions. To avoid obscuring the inventive subject matter with unnecessary detail, various functional modules and/or logic components that are not germane to conveying an understanding of the inventive subject matter have been omitted from FIG. 1. However, a skilled artisan will readily recognize that various additional functional modules and logic components may be used with a network- or web-based application, such as that illustrated in FIG. 1, to facilitate additional functionality that is not specifically described herein. Furthermore, the various functional modules and logic components depicted in FIG. 1 may reside on a single server computer, or may be distributed across several server computers in various arrangements.

As illustrated in FIG. 1, the client computer 20 executes a web browser application 18 to access the web-based question-and-answer application or service over a network. In various alternative embodiments, the client computer 20 may be a mobile computing device, to include: a laptop, mobile phone, e-book reader, or tablet computer. As such, with some embodiments, the question-and-answer application or service may have an interface that is customized for display in a browser, or mobile application, of a mobile device. Furthermore, with some embodiments, the client-based application may not be browser-based, but instead may be customized to suit the particular operating system of the device on which it is executing. For instance, a customized application may utilize one or more application programming interfaces (APIs) that are unique to the particular device and operating system on which the customized application resides and executes.

As shown in FIG. 1, the question-and-answer service 10 includes three separate content delivery or distribution channels 22 by which content may be communicated to users. For purposes of the present disclosure, a channel is a content delivery or distribution mechanism by which content can be communicated and presented to a user. A content distribution channel may leverage an underlying communication mechanism, such as a web server module 16, an email or messaging platform, a short messaging service (SMS), a micro-blogging service, a telephone-based service, and so forth. In the particular embodiment of FIG. 1, three separate content distribution channels 22 are shown, including a content feed 24, notifications 26 and email or messaging 28. Of course, with other embodiments, different content distributions channels may also be used.

The question-and-answer application logic 14 shown in FIG. 1 includes a variety of application modules (not shown) that provide some of the core functionality of the application, to include a content posting module, a messaging and notifications module, and an ask-to-answer module. In general, the content posting module enables users to post questions, answers and comments, as well as other content-related items of information. The messaging and notifications module operates in conjunction with the content posting module to facilitate the generation and communication of messages and notifications, which are communicated to one or more users via one of the content distribution channels 22. Accordingly, when a first user posts an answer to a second user's question via the content posting module, the messaging and notifications module will cause a message or notification to be communicated to the second user, informing the second user of the newly posted answer to the question. The ask-to-answer module analyzes a variety of information to suggest to a user the names of other users who, for various reasons, may be persons to whom a question should be directed. Of course, the application logic 14 may include a number of other modules and logic components that perform a variety of other tasks and functions beyond the immediate scope of the present inventive subject matter. In particular, the inventive concepts described herein might be implemented with a question-and-answer application or service consistent with any one or more of the features and functionality described in related U.S. patent application Ser. No. 12/795,482, entitled, "Methods and Systems for Merging Topics Assigned to Content Items in an Online Community," filed Jun. 7, 2010; U.S. patent application Ser. No. 12/983,056, entitled, "Methods and Systems for Soliciting an Answer to a Question," filed Dec. 31, 2010; U.S. patent application Ser. No. 12/983,062, entitled, "A Multi-Functional Navigation Bar," filed on Dec. 31, 2010; and, U.S. patent application Ser. No. 13/766,417, entitled, "Techniques For Facilitating The Promotion Of Organic Content," filed on Feb. 13, 2013. However, to avoid obscuring the inventive subject matter with unnecessary detail, various functional modules and logic components have not been included in FIG. 1.

The question-and-answer service 10 may be connected to a database management server 32 and/or various databases 34 managed by the database management server 32. A variety of data may be stored in various databases 34. For example, as shown in FIG. 1, databases or database tables may exist for storing user profile data 38. Generally, user profile data 38 includes personal information about each user, such as their name, email address, telephone number, place of employment, educational background, and/or any other type of personal information that might be commonly found on a resume or curriculum vitae. With some embodiments, the user profile data 38 may additionally include location information indicating the geographical location of a residence or workplace of a user, information indicating a user's experience (e.g., work, study, accomplishments, awards received, etc.), and/or information indicating one or more topics on which a user has expertise.

In addition to user profile data 38, social graph data 40 may be stored in a database 34. The social graph data 40 includes information about the various relationships that exist between users of the service, and the content (e.g., questions, answers, comments, blog posts, etc.) that each user has subscribed to, or follows. For example, with some embodiments, users can follow another user—a type of unilateral relationship—and then be informed about information posted to the service by the user that is being followed. In some instances, two users may follow one another—a bilateral relationship, sometimes referred to as a direct connection. Moreover, any user-generated content, to include any of the various content items that might be promoted and presented in a content feed are stored in a database 42. The user-generated content 42 stored in the database tables include, for example, the text of questions, answers, comments, and so forth.

In the context of the present disclosure, a channel is a content delivery and presentation mechanism by which content, including system-generated and/or user-generated content, can be communicated and/or presented to users. Various social media applications utilize a variety of different types of content delivery/distribution channels to present content to users. For instance, one particular channel is referred to herein as a content feed, but may also be commonly referred to and known by others as an activity stream, content stream, status update stream, news feed, or simply a data feed.

Using a content posting module, a user can post or publish some content (e.g., a blog post, a message, a picture, a question, an answer, etc.) to the content feeds of other users. Once posted, the content will appear in the personalized content feeds of any other users who may be connected to, or following, the particular user, or any users who are following a topic to which the posted or published content is related. For example, in the specific case of a question-and-answer service, a user may follow a question, such that, when an answer to the question is posted or published, the answer will automatically be presented in the content feed of the user who is following the question.

Another example of a content delivery/distribution channel is email or messaging where each user has an inbox and is provided with the ability to send and receive emails/messages. With some embodiments, email may provide both a mechanism by which users can communicate with one another, and by which application- or system-generated content can be communicated to users. Furthermore, the email or messaging platform may be web-based, or may use any of a variety of conventional email or messaging protocols to allow access by remote client applications. In yet another example, an application or service may provide a system of notifications. A notification channel may, for example, push certain system-generated content to users. For instance, a notification may be generated upon detecting certain conditions or events. When a user provides a comment regarding a content item, indicates that he or she likes a particular content item, or votes up or down a particular content item, a notification may be generated and communicated to the user who authored the particular content item. Similarly, in the particular context of a question-and-answer service, a user may receive a notification, for example, when another user posts an answer to a question that the user is following. A notification channel may be configured to leverage one or more underlying communication mechanisms. For example, notifications may be communicated via email, SMS, a mobile application, or any other applicable means.

Many of the examples and illustrations provided herein describe or present the inventive subject matter in the particular context of a network- or web-based, question-and-answer application or service. However, skilled artisans will immediately recognize a vast number of other contexts, including other network-based applications and services, to which the inventive concepts are applicable. In particular, the inventive concepts described herein will find application in a wide-variety of network- or web-based services, particularly those that host and encourage user-generated content and/or implement or leverage a social media platform enabling users to interact with and exchange information via one or more content distribution channels, including a content feed or stream, email or messaging platform and system of notifications. Some of the specific types of network-based applications or services to which the inventive concepts are applicable include, but are not limited to, email applications, social network services including business and professional network services, music and video services, photograph sharing applications and services, blog hosting services, and many others. Similarly, the inventive concepts described herein are applicable not only to web-based applications and services accessed via a web browser application, but also mobile applications as well as more traditional desktop client applications.

Figure 2:
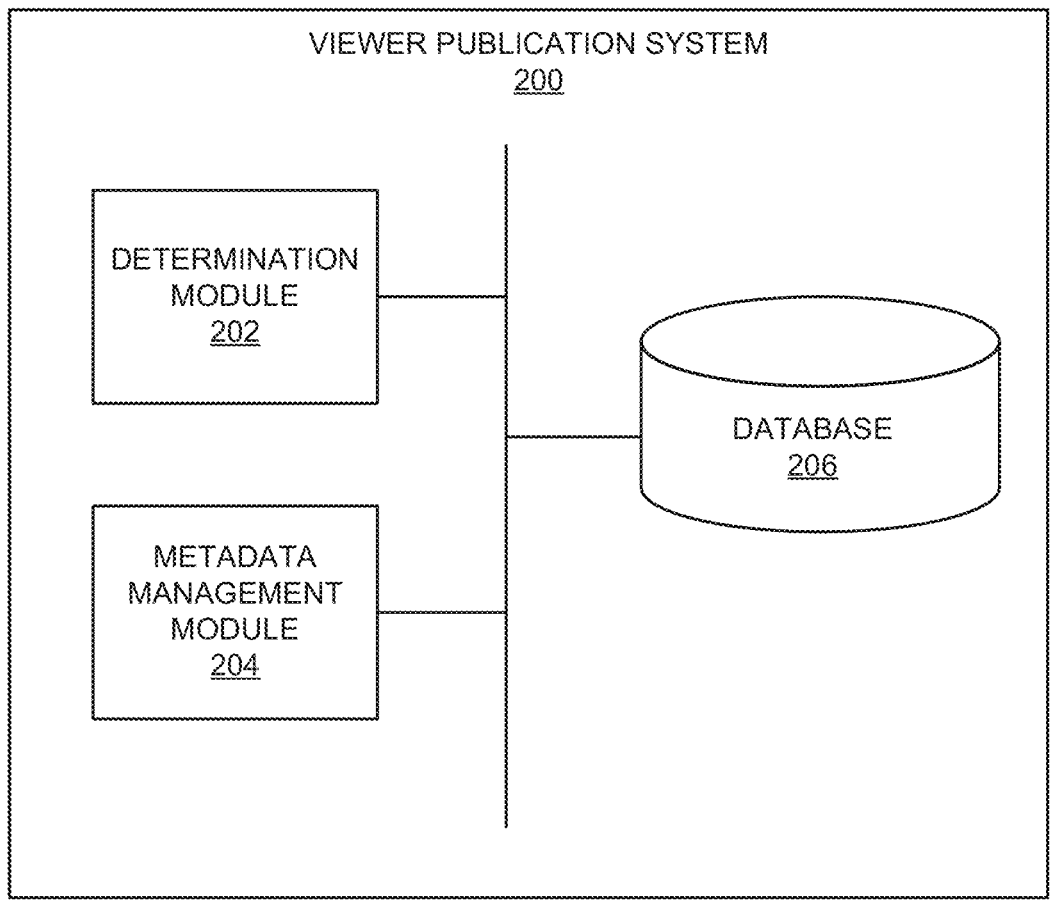
FIG. 2 is a block diagram of an example system, according to various embodiments.

Turning now to FIG. 2, a viewer publication system 200 (which may correspond to the viewer publication system 200 illustrated in FIG. 1) includes a determination module 202, a metadata management module 204, and a database 206. The modules of the viewer publication system 200 may be implemented on a single device such as a viewer publication device, or on separate devices interconnected via a network. The aforementioned viewer publication device may correspond to, for example, a client machine (e.g., the client machine 20 illustrated in FIG. 1) or a server (e.g., the processor-based server(s) implementing the question-and-answer service 10 illustrated in FIG. 1).

Figure 3:
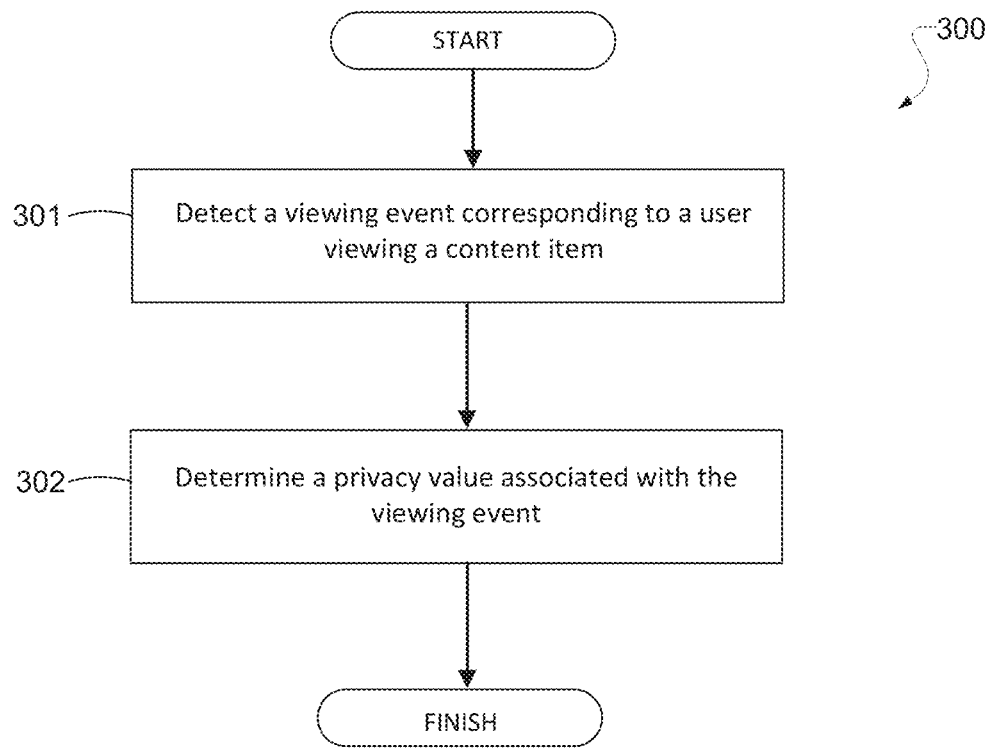
FIG. 3 is a flowchart illustrating an example method, according to various embodiments.

FIG. 3 is a flowchart illustrating an example method 300, according to various embodiments. The method 300 may be performed at least in part by, for example, the viewer publication system 200 illustrated in FIG. 2. Each of the operations in the method 300 will now be described briefly. In 301, the determination module 202 detects a viewing event corresponding to a user viewing a content item. In 302, the determination module 202 determines a privacy value associated with the viewing event that was detected in 301. The privacy value may indicate an inferred sensitivity of the user to publication of the viewing event that was detected in 301. Each of the aforementioned operations 301 and 302, and each of the aforementioned modules of the viewer publication system 200, will now be described in greater detail.

Referring back to FIG. 3, in 301, the determination module 202 detects a viewing event corresponding to a user viewing a content item. The content item may correspond to, for example, a question page (including a question and any corresponding answers) posted on a network-based or web-based question-and-answer service or application, such as the question-and-answer service 10 illustrated in FIG. 1. An example of such a question-and-answer service is Quora.com, which is owned and operated by Quora, Inc. of Mountain View, Calif. FIG. 4 illustrates an example of a content item corresponding to a question page 400 posted on a network-based or web-based question-and-answer service. The question page 400 includes a question 401 ("How hard is it to learn to sail?") and two corresponding answers (answer 402 posted by user "Sandra Liu Huang", and answer 403 posted by user "Tudor Achim"). The question page 400 identifies topics 404 associated with the question (e.g., "Self-teaching", "Sailing", "Boats", etc.). The question page 400 permits the viewing user "John Smith" to add an answer to the posted question via the text entry window 405.

The determination module 202 may detect a viewing event in any one of various ways understood by those skilled in the art. For example, the determination module 202 may detect the viewing event when a web browser (such as web browser application 18 illustrated in FIG. 1) transmits user authentication information corresponding to an account of a user to the question-and-answer service 10 in order to login to the user's account on the question-and-answer service 10. Thereafter, the web browser may access a reference link (e.g., uniform resource locator or URL) corresponding to the question page 400, indicating that the user is viewing the question page 400.

In the example described above (and in various examples described throughout this disclosure), the content item corresponds to a webpage in its entirety (such as the question page 400 in FIG. 4), in the interests of simplicity and clarity. However, as apparent to those skilled in the art, a web page may include multiple content items, wherein each of the content items corresponds to a particular component, portion, sub-portion, area, section, etc., included or displayed in the webpage. Thus, a viewing user may be viewing multiple content items on a webpage simultaneously, in a case where the viewing user is viewing a webpage that includes the multiple content items. Thus, if the determination module 202 determines that a user is viewing a webpage that includes multiple content items, each piece of content being viewed by the user may be associated with a separate "viewing event", in accordance with various embodiments described throughout.

While various embodiments of this disclosure describe content items posted on a question-and-answer service (such as question content items, answer content items, content feeds, profile pages, topics, and so on), it is understood that the techniques described in various embodiments are not limited to such exemplary content items. For example, the techniques described in various embodiments throughout are applicable to various types of online and offline content including webpages, websites, blogs, bulletin boards, discussion forums, posts, reviews, articles, publications, presentations, profile pages, news feeds, content feeds, etc., where such content items may be distributed or disseminated in any online or offline format, via any online or offline distribution or delivery channel including electronic communications such as e-mails, text messages (such as short message service (SMS) text messages or multimedia messaging service (MMS) text messages), instant messages, chat messages, video chat messages, and so on.

Turning now to FIGS. 4-10, various exemplary aspects of the question-and-answer service 10 will now be described with reference to the examples in FIGS. 4-10. The question-and-answer service 10 may include various types of content, including question pages (such as the question page 400 illustrated in FIG. 4), as well as user profile pages associated with users of the question-and-answer service 10, personalized content feeds for each user of the question-and-answer service 10, and topic-specific content feeds associated with various topics.

Figure 5:
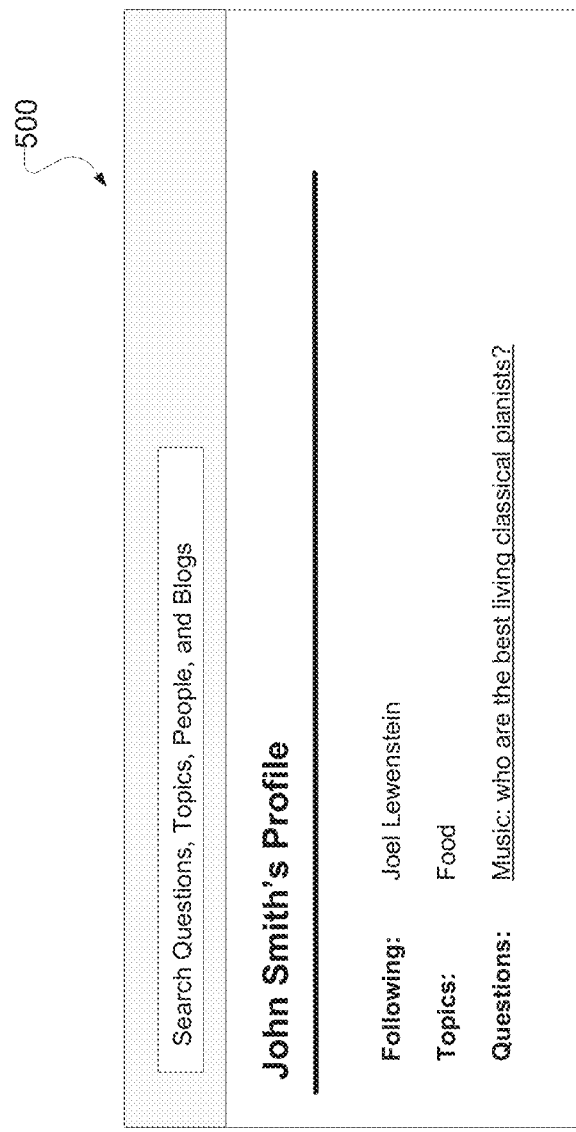
FIG. 5 illustrates an exemplary portion of a user interface that displays a user profile, according to various embodiments.

For example, FIG. 5 illustrates a profile page 500 of a user "John Smith". The user profile page 500 identifies various types of questions, topics, or users that may be followed by the user John Smith. For example, the question-and-answer service 10 may enable the user to follow a specific question, a specific topic, or a specific user, in order to receive updates regarding the aforementioned questions, topics, or users in the form of a personalized content feed, such as the personalized content feed 600 of the user John Smith illustrated in FIG. 6. The user profile page 500 indicates that the user John Smith is following one other user ("Joel Lewenstein"), and is following one topic ("Food"), and is following one question ("Music: who are the best living classical pianists?"). Accordingly, the personalized content feed 600 of the user John Smith illustrated in FIG. 6 displays various updates to the aforementioned user, topic, and question being followed by the user John Smith. For example, the content feed 600 indicates that the followed user "Joel Lewenstein" has followed a question, promoted a question, voted up (or a voted down) an answer to a question, followed a topic, added an answer to a question, added a question, and so on. Further, the content feed 600 indicates that, for the followed topic of "Food", a question has been added to the topic, another question has been promoted in the topic, an answer has been added in response to a question in the topic, and so on. Moreover, the content feed 600 indicates that, for the followed question "Music: who are the best living classical pianists?", another user has promoted the question, an answer has been added to the question, another user has voted up (or a voted down) an answer to the question, and so on. The personalized content feed 600 may include various other information, as understood by those skilled in the art.

Figure 7:
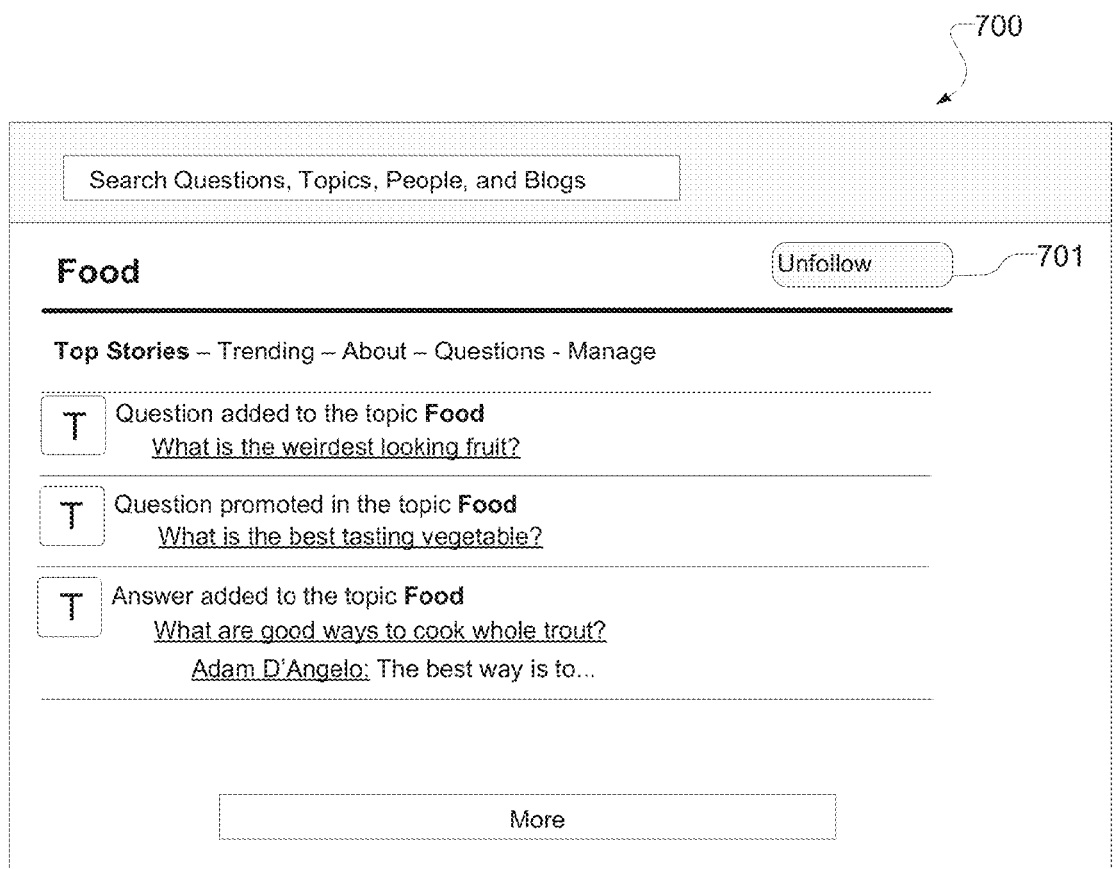
FIG. 7 illustrates an exemplary portion of a user interface that displays a topic-specific content feed, according to various embodiments.
Figure 8:
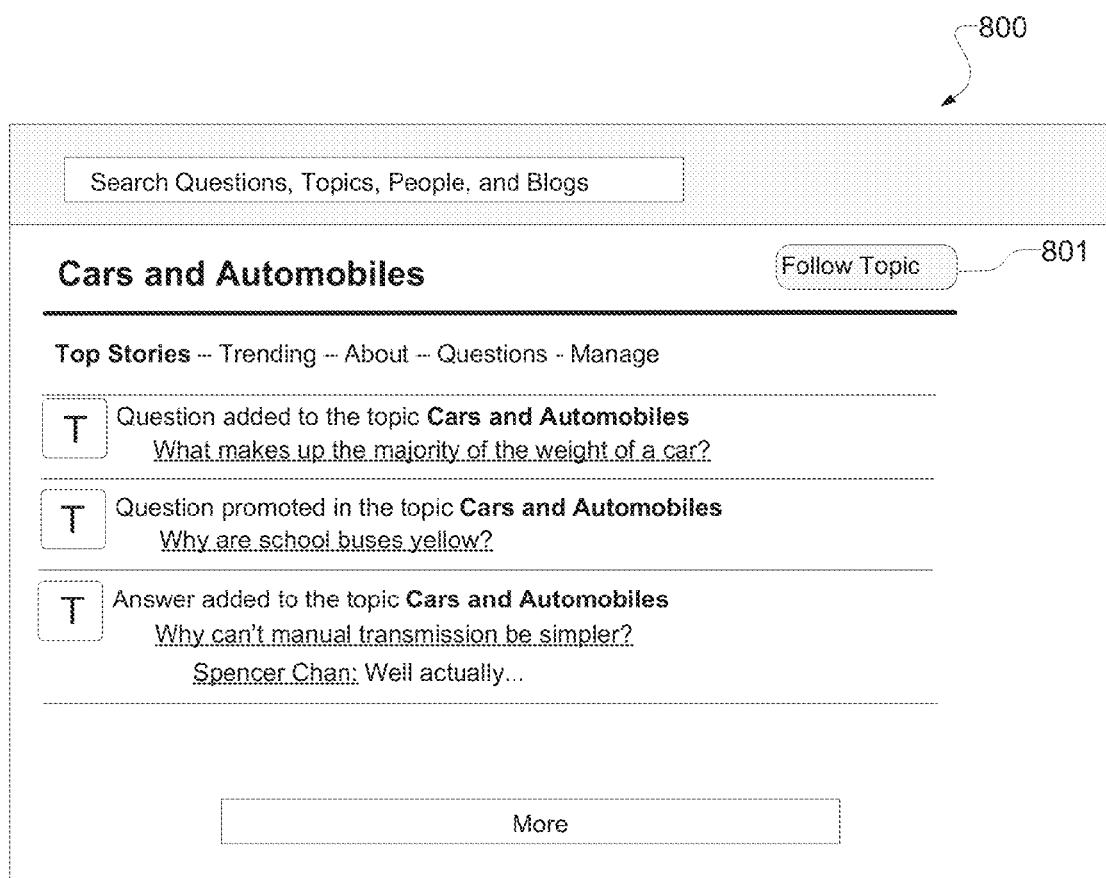
FIG. 8 illustrates an exemplary portion of a user interface that displays a topic-specific content feed, according to various embodiments.

The question-and-answer service 10 may also include topic-specific webpages or topic-specific content feeds displaying updates associated with specific topics. For example, FIG. 7 illustrates a topic-specific content feed 700 for the topic of Food, wherein the topic-specific content feed 700 displays updates associated with the topic of Food (similar to some of the updates included in the general content feed 600 in FIG. 6). Since the user John Smith is already following the topic of Food, the topic specific content feed 700 includes an "Unfollow" user interface element 701 that, upon selection, enables the user John Smith to stop following the topic of Food (and thereby stop receiving updates regarding this topic in the personalized content feed 600). As another example, FIG. 8 illustrates a topic-specific content feed 800 for the topic of Cars and Automobiles, wherein the topic-specific content feed 800 displays updates associated with the topic of Cars and Automobiles. Since the user John Smith is not already following the topic of Cars and Automobiles, the topic specific content feed 800 includes a "Follow" user interface element 801 that, upon selection, enables the user John Smith to follow the topic of Cars and Automobiles (and thereby receive updates regarding this topic in the personalized content feed 600).

The question-and-answer service 10 may also include profile webpages for each of the users of the question-and-answer service 10. For example, FIG. 9 illustrates a profile page 900 for user Joel Lewenstein, wherein the profile page 900 displays updates associated with user Joel Lewenstein (similar to some of the updates in the general content feed 600 in FIG. 6). Since the user John Smith is already following the user Joel Lewenstein, the topic specific content feed 900 includes an "Unfollow" user interface element 901 that, upon selection, enables the user John Smith to stop following the user Joel Lewenstein (and thereby stop receiving updates regarding this user in the personalized content feed 600). As another example, FIG. 10 illustrates a user profile page 1000 for the user Adam D'Angelo, wherein the profile page 1000 displays updates associated with the user Adam D'Angelo. Since the user John Smith is not already following the user Adam D'Angelo, the profile page 1000 includes a "Follow" user interface element 1001 that, upon selection, enables the user John Smith to follow the user Adam D'Angelo (and thereby receive updates regarding this user in the personalized content feed 600).

Returning back to the method 300 in FIG. 3, after the determination module 202 detects a viewing event corresponding to a user viewing a content item (in 301), the determination module 202 determines a privacy value associated with the viewing event (in 302). According to various embodiments, the privacy value may indicate an inferred sensitivity of the user to publication of the viewing event. According to an embodiment, the privacy value may be one of two values in a binary system, such as "0" or "1", "true" or "false", "low" or "high", etc. According to another embodiment, the privacy value may be a value selected from a range of values, such as a number in the range "0" to "10", a letter in the range of "A" to "Z", any one of "low", "medium" or "high", etc.

The aforementioned privacy value indicates an inferred value of how private the viewing event was from the perspective of the viewing user, and/or indicates an inferred sensitivity of the viewing user to publication of the viewing event. Put another way, the privacy value indicates whether a publication of the viewing event could be considered by the viewing user as disclosure of private information about the viewing user. For example, if the privacy value associated with the viewing event is "low", this indicates that the viewing user likely does not consider their viewing of the content item a private event, and/or the viewing user is probably not averse to the publication of the viewing event. In such a case, the publication of the viewing event is likely not considered by the viewing user as disclosure of private information about the viewing user. On the other hand, if the privacy value associated with the viewing event is "high", this indicates that the viewing user likely does consider their viewing of the content item a private event, and/or the viewing user is probably averse to the publication of the viewing event. In such a case, the publication of the viewing event is likely considered by the viewing user as disclosure of private information about the viewing user. The determination module 202 may determine the privacy value based on any one of various techniques described herein.

According to various embodiments, the determination module 202 may determine the privacy value based on content included in a content item being viewed. For example, the determination module 202 may access a privacy policy that lists keywords (perhaps in the format of the lookup table) that represent subject matter classified as private. For example, FIG. 11 illustrates privacy policy information 1100 corresponding to one or more privacy policies, where the privacy policy information 1100 may be stored in, for example, database 34 (see FIG. 1) or database 206 (see FIG. 2). As illustrated in FIG. 11, a privacy policy in the privacy policy information 1100 lists the private keywords "Healthcare", "Romance", and "Adult" as representing subject matter classified as private. Accordingly, the determination module 202 may access data included in a content item (e.g., metadata or HTML code associated with the question page 400) and perform a keyword search for any of the private keywords defined in the privacy policy information 1100. If the determination module 202 detects any of these private keywords in the content item, then the determination module 202 may classify the content item as private, and may therefore determine that the privacy value associated with the viewing of the content item in 301 is, for example, a "high" value. On the other hand, if the determination module 202 does not detect any of these private keywords in the content item, then the determination module 202 may classify the content item as public, and may therefore determine that the privacy value associated with the viewing of the content item in 301 is, for example, a "low" value.

According to various embodiments, the private keywords identified in, for example, the privacy policy information 1100, may represent a set of global private keywords that identify subject matter that is considered globally private (e.g., based on global sensitivities). Thus, the determination module 202 may determine that any viewing events of subject matter containing global private keywords is private, regardless of the identity of the viewing user that is viewing the underlying subject matter. According to another exemplary embodiment, the privacy policy information 1100 may include a set of personal private keywords that identify subject matter that is considered personally private for a particular user (e.g., based on the personal sensitivities of that user). For example, multiple user-specific privacy policies may exist, where each user-specific privacy policy identifies a set of personal private keywords specified by that user. Privacy policies may store a set of personal private keywords instead of, or in addition to, the set of global private keywords. Accordingly, if the determination module 202 determines that a particular user "Arthur Smith" is viewing a content item including the keyword "Exercise", and a privacy policy for Arthur Smith indicates that the word "Exercise" has been added as a personal private keyword, then the determination module 202 may determine that the privacy value associated with Arthur Smith viewing the content item is, for example, a "high" value (even though "Exercise" may not be in the set of global private keywords). On the other hand, if the determination module 202 determines that a particular user "Annabel Smith" is viewing the same content item including the keyword "Exercise", and a privacy policy for Annabel Smith does not indicate that the word "Exercise" is a personal private keyword, then the determination module 202 may determine that the privacy value associated with Annabel Smith viewing the content item is, for example, a "low" value (assuming "Exercise" is not in the set of global private keywords either).

According to various embodiments, the determination module 202 may determine the privacy value based on a topic associated with the content item being viewed. For example, the determination module 202 may access a privacy policy that lists topics (perhaps in the format of the lookup table) that represent subject matter classified as private. For example, a privacy policy in the privacy policy information 1100 (see FIG. 11) lists the private topics "Healthcare", "Romance", and "Adult" as representing subject matter classified as private. Accordingly, the determination module 202 may access data included in a content item (e.g., metadata or HTML code associated with the question page 400) and determine any topics that the content item is associated with. For example, with reference to the exemplary question page 400 illustrated in FIG. 4, the determination module 202 will determine that the question page 400 is associated with the topics 404 "Self-teaching", "Sailing", and "Boats". If the determination module 202 determines that the content item is associated with any of the private topics listed in the privacy policy information 1100, then the determination module 202 may classify the content item as private, and may therefore determine that the privacy value associated with the viewing of the content item in 301 is, for example, a "high" value. On the other hand, if the determination module 202 determines that the content item is not associated with any of the private topics identified in the privacy policy information 1100, then the determination module 202 may classify the content item as non-private, and may therefore determine that the privacy value associated with the viewing of the content item in 301 is, for example, a "low" value.

According to various embodiments, the private topics identified in, for example, the privacy policy information 1100, may represent a set of global private topics that identify subject matter that is considered globally private (e.g., based on global sensitivities). Thus, the determination module 202 may determine that any viewing events of subject matter associated with global private topics are private, regardless of the identity of the viewing user that is viewing the underlying subject matter. According to another exemplary embodiment, the privacy policy information 1100 may include a set of personal private topics that identify subject matter that is considered personally private for a particular user (e.g., based on the personal sensitivities of that user). For example, multiple user-specific privacy policies may exist, where each user-specific privacy policy identifies a set of personal private topics specified by that user. Privacy policies may store a set of personal private topics instead of, or in addition to, the set of global private topics. Accordingly, if the determination module 202 determines that a particular user "Arthur Smith" is viewing a content item associated with the topic "Exercise", and a privacy policy for Arthur Smith indicates that the topic "Exercise" has been added as a personal private topic, then the determination module 202 may determine that the privacy value associated with Arthur Smith viewing the content item is, for example, a "high" value (even though "Exercise" may not be in the set of global private topics). On the other hand, if the determination module 202 determines that a particular user "Annabel Smith" is viewing the same content item associated with the topic "Exercise", and a privacy policy for Annabel Smith does not indicate that the topic "Exercise" is a personal private topic, then the determination module 202 may determine that the privacy value associated with Annabel Smith viewing the content item is, for example, a "low" value (assuming "Exercise" is not in the set of global private topics either).

Accordingly, consistent with various embodiments, the determination module 202 may determine the privacy value based on a content distribution channel 22 (see FIG. 1) via which the user is notified of the content item. For example, consider a case in which the user profile page 500 is accessible by other users with accounts on the question-and-answer service 10 (and perhaps other users without accounts on the question-and-answer service 10); in such case, the contents of the user profile page 500, including the information about users, topics, and questions being followed by the user 500, may be considered public information. Accordingly, a set of privacy rules in the privacy rule information 1100 may indicate that any question pages accessed directly from a personalized content feed (such as personalized content feed 600 of the user John Smith) or a weekly digest e-mail (including similar content as the personalized content feed 600) may be considered a non-private viewing event. In other words, publication of the fact that the user John Smith has viewed any of the questions accessed from the personalized content feed 600 or a weekly digest e-mail is likely not a disclosure of private information, if the information included in the user John Smith's content feed or a weekly digest e-mail is sourced from the topics, questions, and people already being followed by the user John Smith (because such topics, questions, and people being followed is already public information identified in the user profile page 500 of the user John Smith). For example, publication of the fact that John Doe viewed a question page for a question "Who are the best psychiatrists?" is likely not a disclosure of private information if John Doe is publicly following the topic "Psychiatrists" as indicated on his public profile page, and if he accessed this question page because it was included in his personalized content feed. On the other hand, if the user John Smith accesses a content item such as a question page for a question "Who are the best psychiatrists?" directly (e.g., by entering the URL of the question page directly into an address bar of a web browser), the publication of this view may reveal private information about the browsing history of the user. As another example, if the user John Smith accesses a content item such as a question page for a question "Who are the best psychiatrists?" via browsing or "surfing" through various other webpages, the publication of this view viewing may reveal private information about the browsing history of the user.

Accordingly, consistent with various embodiments, the determination module 202 may determine the privacy value based on a content distribution channel 22 (see FIG. 1) via which the user is notified of the content item. Examples of content distribution channels include content feeds, weekly digests, notifications, emails, text messages (e.g., short message service or SMS messages, multimedia messaging service or MMS messages, etc.), instant messages, chat messages, video chat messages, video conferencing, and so on. For example, the determination module 202 may access a privacy policy that lists content distribution channels (perhaps in the format of the lookup table) as being classified as either public or private. For example, a privacy policy in the privacy policy information 1100 (see FIG. 11) indicates that information accessed via the content distribution channels of a content feed 24 or e-mail/messages 28 (e.g., weekly digests) are public, whereas information accessed via the content distribution channel of notifications 26 are private. Thus, if the determination module 202 determines that the viewer accessed the content item as a result of selecting a reference link included in a content feed 24 or e-mail/message 28, then the determination module 202 may classify the content item as public, and may therefore determine that the privacy value associated with the viewing of the content item in 301 is, for example, a "low" value. On the other hand, if the determination module 202 determines that the viewer accessed the content item as a result of selecting a reference link included in a notification 26, then the determination module 202 may classify the content item as private, and may therefore determine that the privacy value associated with the viewing of the content item in 301 is, for example, a "high" value. An example of a content feed 600 of the user John Smith is illustrated in FIG. 6.

According to various embodiments, the determination module 202 may determine the privacy value based on a previous content item viewed by the user before the user viewed the current content item, where the user accessed the current content item from a reference link in the previous content item. For example, the determination module 202 may access a privacy policy that lists content items such as webpages or a webpage URLs (perhaps in the format of the lookup table) that are classified as either public or private. For example, a privacy policy in the privacy policy information 1100 (see FIG. 11) indicates that content items accessed via a link included in (a) a content feed webpage or (b) a topic-specific content feed webpage of a topic that a user is already following, are public, whereas content items accessed via links from any other webpages are private. Thus, the determination module 202 may access browsing history information of the viewing user in order to determine if the user is viewing a current content item (e.g. question page 400) as a result of selecting a reference link from one of the public webpages in the privacy policy information 1100. For example, if the determination module 202 determines that the viewer accessed the content item as a result of selecting a reference link included in a content feed 24, then the determination module 202 may classify the content item as public, and may therefore determine that the privacy value associated with the viewing of the content item in 301 is, for example, a "low" value. An example of a content feed 600 of the user John Smith is illustrated in FIG. 6. On the other hand, if the determination module 202 determines that the viewer accessed the content item as a result of, for example: (a) entering the URL for the content item directly into an address location bar of a web browser; (b) clicking on a link in a webpage other than one of the public webpages listed in the privacy policy information 1100, which may include miscellaneous browsing through various webpages and links (e.g., clicking on the related questions 406 in FIG. 4), or (c) entering a search query into a search bar, and clicking on one of the search results in a search results page, then the determination module 202 may determine that the privacy value associated with these viewing events is, for example, a "high" value.

According to various embodiments, the determination module 202 may determine the privacy value based on public interaction events between the user and the content item being viewed by the user. For example, if the user takes some public action on the content item that is published to other users of the question-and-answer service 10, such as posting the content item, posting a response to the content item, following the content item, or voting on the content item, then it can be inferred that the user's underlying viewing of the content item is not a private event. For example, the determination module 202 may access a privacy policy that lists interaction events (perhaps in the format of the lookup table) that are classified as either public or private. For example, a privacy policy in the privacy policy information 1100 (see FIG. 11) indicates that interaction events involving a question (e.g., question page 400), such as posting the question, posting an answer in response to the question, following the question, or a voting on the question, are classified as public. For example, if the determination module 202 determines that the viewer performed any of the aforementioned public interaction events with the particular content item, then the determination module 202 may determine that the privacy value associated with the viewing of the content item in 301 is, for example, a "low" value.

Information included in the privacy policy information 1100 of FIG. 11 is merely illustrative, and it is understood that any of the privacy policies are completely customizable and configurable. For example, according to various exemplary embodiments, the viewer publication system 200 may provide a user interface allowing a user (e.g., an administrator, employee, or user of the question-and-answer service 10) to adjust any of the privacy policies as desired. Moreover, privacy policy information 1100 may be generated on a per-user basis, based on settings, requests, or preferences of individual users.

According to various exemplary embodiments described in greater detail below, the viewer publication system 200 may generate metadata describing each viewing event. The metadata for a given viewing event may describe, for example, a viewing date/time, a location (IP address) of a device having a web browser through which the content item was viewed, a location (city, state, country etc.) corresponding to the aforementioned IP address, a name of the viewing user, a link to the profile of the viewing user, and a link to the content item viewed. According to various exemplary embodiments, the metadata may also include privacy values associated with each viewing event. According to various exemplary embodiments, the metadata may also include view reason information describing how, for example, the user accessed the viewed content item or how the user was notified of the content item.

Moreover, according to various exemplary embodiments described in more detail below, the viewer publication system may aggregate all metadata describing viewing events corresponding to a particular content item, and associate this aggregated metadata with the content item. Thereafter, the viewer publication system 200 may display a "views" page that may be linked to the content item and that may list viewers of the content item, where some of the viewers may be fully identified while other reviewers may be anonymized, based on the privacy values and/or view reasons associated with each viewer's interaction with the underlying content item. The views page may also describe how various viewers came upon that particular content item, based on the view reason information included in the metadata describing each of the viewing events.

Figure 12:
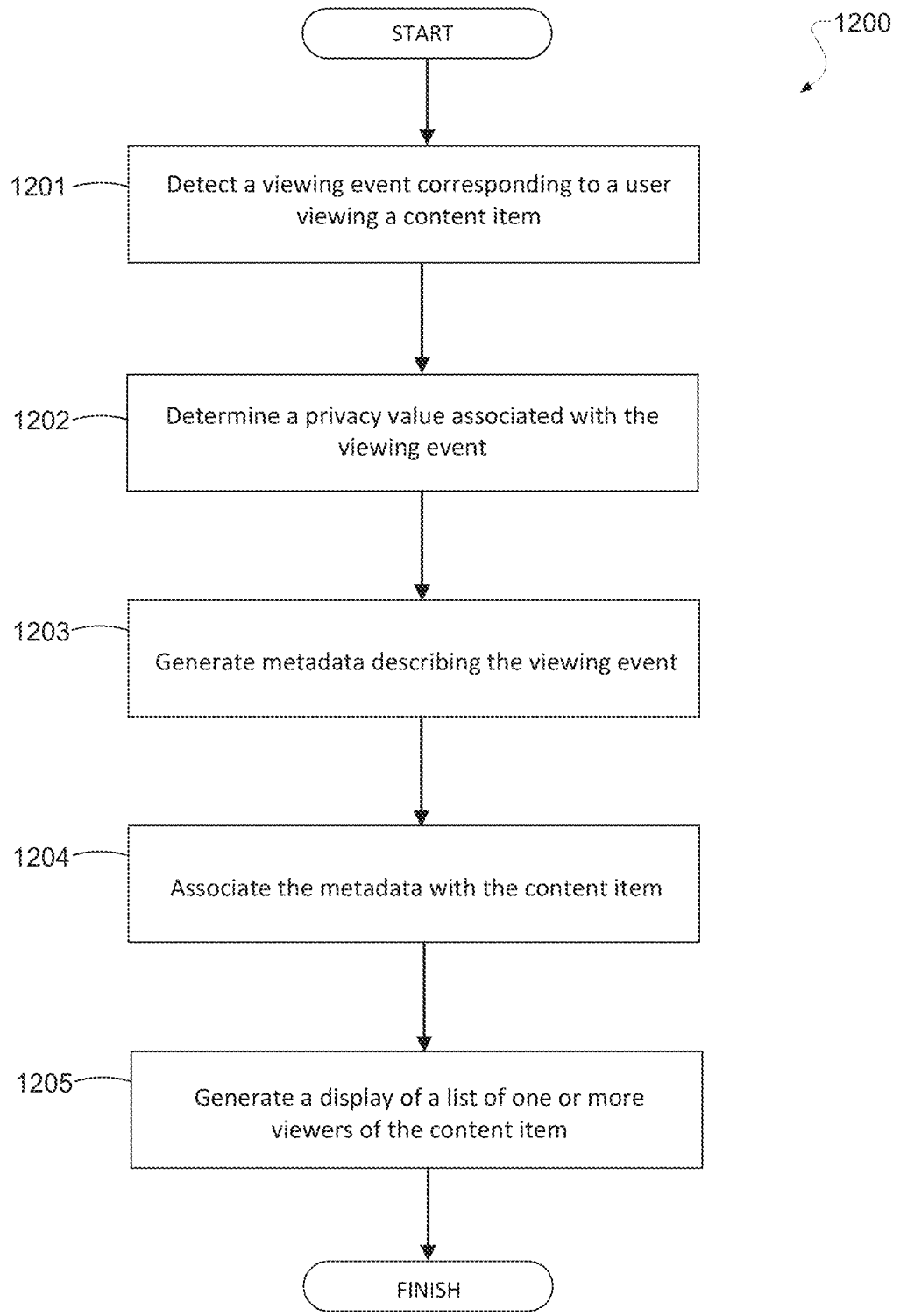
FIG. 12 is a flowchart illustrating an example method, according to various embodiments.

For example, FIG. 12 is a flowchart illustrating an example method 1200, according to various embodiments. The method 1200 may be performed at least in part by, for example, the viewer publication system 200 illustrated in FIG. 2. 1201 and 1202 are similar to 301 and 302 in the method 300 illustrated in FIG. 3. For example, in 1201, the determination module 202 detects a viewing event corresponding to a user viewing a content item, and in 1202, the determination module 202 determines a privacy value associated with the viewing event that was detected in 1201. The privacy value may indicate an inferred sensitivity of the user to publication of the viewing event that was detected in 1201. In 1203, the metadata management module 204 generates metadata describing the viewing event. In 1204, the metadata management module 204 associates the metadata generated in 1203 with the content item that was viewed in 1201. In 1205, the metadata management module 204 generates a display, via a user interface in a device (such as the client computer 20 illustrated in FIG. 1), of a list of one or more viewers of a content item, based on metadata associated with views of the content item, such as the metadata generated in 1203. According to various exemplary embodiments, the operation 1205 in the method 1200 is optional. According to various other exemplary embodiments, the operations 1203 and 1204 in the method 1200 are optional. Each of the aforementioned operations 1203-1205 will now be described in greater detail.

After the determination module 202 determines a privacy value associated with the viewing event (in 1202), the metadata management module 204 generates metadata describing the viewing event in 1203. FIG. 13 illustrates exemplary portions of metadata 1301-1304, each of which describes an exemplary viewing event having a "low" privacy value. Each of the metadata portions 1301-1304 includes, for a given viewing event, a viewing date/time, a location (IP address) of a device having a web browser through which the content item was viewed, a location (city, state, country etc.) corresponding to the aforementioned IP address, a name of the viewing user, a link to the profile of the viewing user, and a link to the content item viewed. Each of the metadata portions 1301-1304 associated with a particular viewing event may also optionally include the privacy value associated with that event.

As illustrated in FIG. 13, the metadata generated by the metadata management module 204 may also optionally include a "viewing reason" or "view reason information" that identifies how the user was notified of the content item and/or how the content item came to the user's attention. For example, if the content item is the question page 400 illustrated in FIG. 4, and if the user accessed the question by accessing the link 601 in the content feed 600, then the view reason information may identify the user Joel Lewenstein. In other words, the view reason information may identify another person followed by or connected to the user, where the user became aware of the content or was led to the content "via" the other person. This view reason indicates that an entry (with a reference link) in the user's content feed notified the user of an interaction between the other person followed by the user and a content item, and the user viewed the content item as a result of clicking the associated reference link in the content feed. An example of metadata generated by the metadata management module 204 that describes such a viewing event is the metadata portion 1301 in FIG. 13, which includes the view reason "via Joel Lewenstein".

As another example, if the content item viewed by the user is the question "What is the weirdest looking fruit?" corresponding to the reference link 602 in the content feed 600, and if the user accessed this question page by accessing the link 602 in the content feed 600, then the view reason information may identify the topic Food. In other words, the view reason information may identify a topic followed by or connected to the user, where the user became aware of the content or was led to the content "via" the topic. This view reason indicates that an entry (with a reference link) in the user's content feed notified the user of an association between a content item and a topic followed by the user, and the user viewed the content item as a result of clicking the associated reference link in the content feed. An example of metadata generated by the metadata management module 204 that describes such a viewing event is the metadata portion 1302 in FIG. 13, which includes the view reason "via Food".

As another example, if the content item viewed by the user is the question "Music: who are the best living classical pianists?" included in a Weekly Digest transmitted to the user, and if the user accessed this question page by accessing a link in the Weekly Digest, then the view reason information may identify the Weekly Digest. In other words, the view reason information may identify a content distribution channel via which the user is notified of the content item. Examples of content distribution channels include content feeds, weekly digests, notifications, emails, text messages (e.g., short message service or SMS messages, multimedia messaging service or MMS messages, etc.), instant messages, chat messages, video chat messages, video conferencing, and so on. An example of metadata generated by the metadata management module 204 that describes such a viewing event is the metadata portion 1303 in FIG. 13, which includes the view reason "via Weekly Digest".

As another example, if the content item was viewed by the user while the user took some public action with respect to the content item (e.g., posting the content item, post a response to the content item, following the content item, or voting on the content item, etc.), then the view reason information may identify the question itself. An example of metadata generated by the metadata management module 204 that describes such a viewing event is the metadata portion 1304 in FIG. 13, which includes the view reason "via the Question".

While the aforementioned metadata portions 1301-1304 described viewing events having a "low" privacy value, the metadata management module 204 may also generate similar metadata portions for viewing events having "high" privacy values. For example, FIG. 14 illustrates metadata portions 1401-1404 describing viewing events having "high" privacy values. As illustrated in FIG. 14, each of the metadata portions 1401-1404 includes privacy values, as well as view reasons indicating how the user was notified of the content item, how the content item came to the user's attention, how the user accessed the content item, etc. For example, metadata portion 1401 includes a view reason of "via Notification", where the user was notified of the content item through a notification message transmitted to the user (e.g., via the question-and-answer service 10), and where the user accessed the content item by selecting a reference link to the content item included in the notification message. As another example, metadata portion 1402 includes a view reason of "via Direct URL Entry" where the user accessed the content item by entering the URL for the content item directly into an address location bar of a web browser. As another example, metadata portion 1403 includes a view reason of "via Browsing Links" where the user accessed the content item by selecting a link in a webpage (e.g., other than one of the public webpages listed in the privacy policy information 1100), which may include miscellaneous browsing through various webpages and links (e.g., clicking on the Related Questions 406 in FIG. 4). As another example, metadata portion 1404 includes a view reason of "via Search Results" where the user accessed the content item by entering a search query into a search bar (e.g., a search bar of the question-and-answer service 10) and clicking on one of the search results in a search results page. It is understood that the metadata portions in FIG. 13 in FIG. 14 are merely exemplary, and the metadata generated by the metadata management module 204 may include other information in addition to or instead of the information illustrated in FIG. 13 in FIG. 14. For example, the metadata generated by the metadata management module 204 does not need to include the privacy value or view reason information.

Referring back to the method 1200 in FIG. 12, in 1204, the metadata management module 204 associates the metadata generated in 1203 with the content item. For example, the metadata management module 204 may store the metadata describing the viewing event in association with stored metadata associated with the content item (e.g., user generated content 42 stored in database 34 illustrated in FIG. 1). The association may also include inserting, into the metadata describing the viewing event, a link to the content item (see FIGS. 12 and 13). The association may also include inserting, into metadata associated with the content item, a reference link to the metadata describing the viewing event.

In 1205 of FIG. 12, the metadata management module 204 generates a display, via a user interface in a device (such as the client computer 20 illustrated in FIG. 1), of a "views page" associated with the particular content item that includes a list of viewers of the content item. The views page may be generated based on metadata associated with views of the content item, such as the metadata generated by the metadata management module 204 in 1203. According to various exemplary embodiments, the views page may also describe how various viewers came upon that particular content item, based on the view reason information included in the metadata describing each of the viewing events.

Figure 15:
FIG. 15 illustrates an exemplary portion of a user interface that displays a list of viewers of a content item, according to various embodiments.

According to various exemplary embodiments, some of the viewers may be fully identified while other viewers may be anonymized, based on the privacy values associated with each viewer's interaction with the underlying content item. For example, if a viewing event performed by a particular user has a "low" privacy value (as indicated by the privacy value included in the metadata describing that viewing event, as depicted in FIG. 13), then the views page may include identification information of the user (e.g., user name) and the view reason information associated with the viewing event, based on the metadata describing that viewing event. For example, FIG. 15 illustrates an example of a views page 1500 associated with the question page 400 illustrated in FIG. 4. The views page 1500 may be displayed in response to user selection of the user interface element 407 (e.g., a reference link) in the question page 400. In the views page 1500, the identification 1501 of the user John Smith is generated based on the metadata portion 1301 in FIG. 13, in a case where the user John Smith viewed the question page 400 after clicking on the link 601 in the personalized content feed 600 (see FIG. 6). Thus, the identification 1501 includes identification information of the user John Smith and the view reason "via Joel Lewenstein" for this viewing event, based on the metadata portion 1301 in FIG. 13. On the other hand, if a viewing event performed by a given user has a "high" privacy value (as indicated by the privacy value included in the metadata describing that viewing event, as illustrated in FIG. 14), then the views page may simply list an anonymous user 1402 (e.g., "visitor"). As illustrated in FIG. 15, the view reason information itself may also be omitted from the listings for anonymous users, such as the anonymous user listing 1502. Alternatively, it is possible that the views page may include the view reason information in the listings for anonymous users.

Figure 12A:
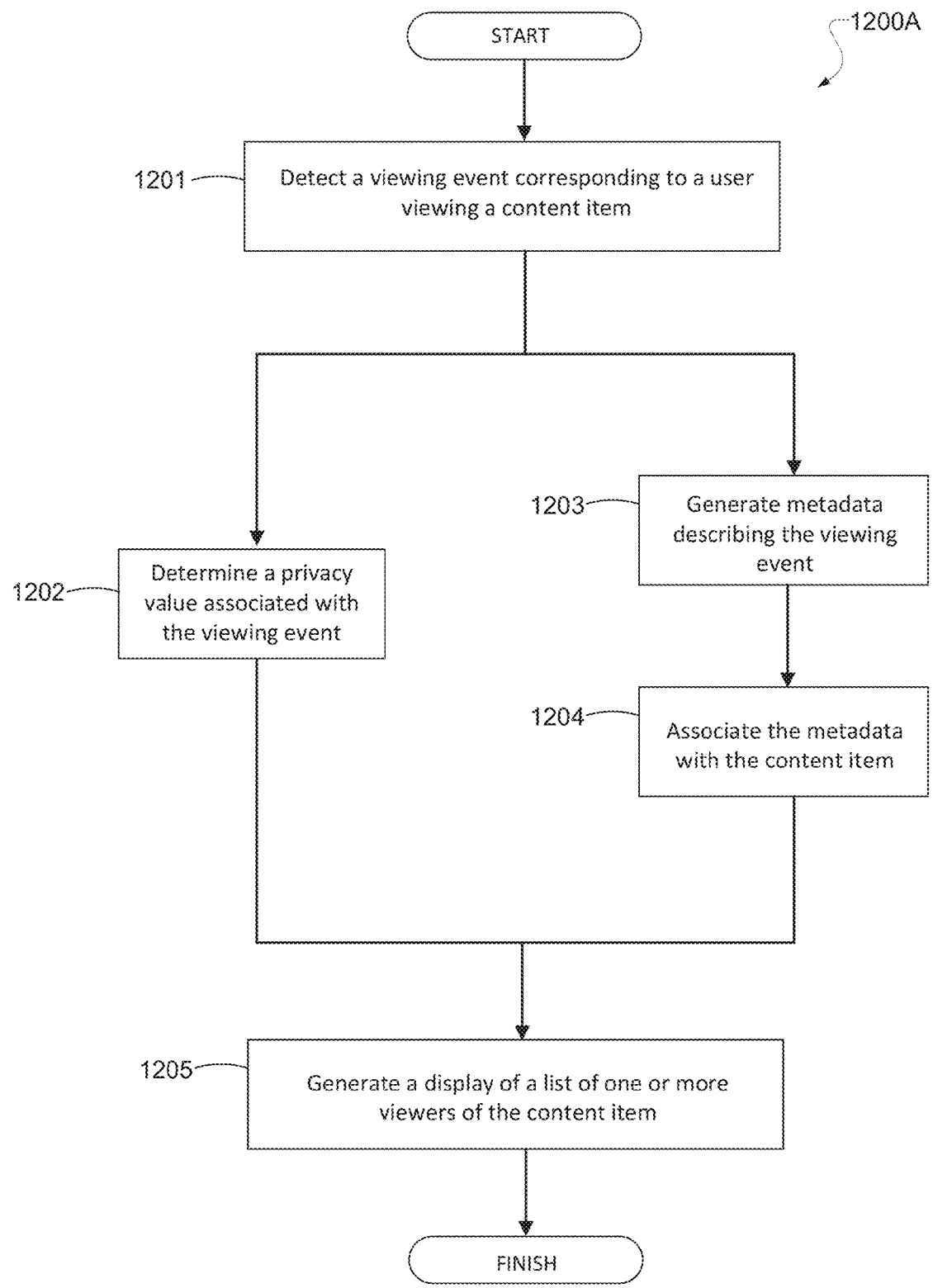
FIG. 12A is a flowchart illustrating an example method, according to various embodiments.

Referring back to FIG. 12, note that various ones of operations 1202-1204 may be omitted or re-arranged, according to various non-limiting embodiments. For example, FIG. 12A illustrates a method 1200A according to an exemplary non-limiting embodiment, where the method 1200A is a variation of the method 1200 of FIG. 12. In the method 1200A, the operation 1202 may occur at any time between operations 1201 and 1205. Likewise, the operations 1203 and 1204 may also occur at any time between operations 1201 and 1205. In other words, the operation 1202 may occur before, simultaneously, or after operation 1203 and/or operation 1204. This is because the operations 1203 and 1204 may not be dependent on the operation 1202, and/or because the operation 1202 may not be dependent on the operations 1203 and 1204, according to various non-limiting embodiments.

As described above, the determination of whether viewers should be fully identified or anonymized in the views page may be made based on privacy values. According to various exemplary embodiments, the determination of whether viewers should be fully identified or anonymized in the views page may instead—or in addition—be made based on the view reason information included in the metadata describing a viewing event. For example, this may be the case when metadata portions describing viewing events do not include privacy values therein. The metadata management module 204 may access a set of rules or policies indicating that viewing events associated with specific types of view reasons should be fully identified in the views page (such as views page 1500 illustrated in FIG. 15), whereas viewing events associated with other specific types of view reasons should be anonymized in the views page.

Figure 16:
FIG. 16 illustrates exemplary metadata, according to various embodiments.

According to various exemplary embodiments described above, the metadata management module 204 may generate the identification information and/or the view reason information for inclusion in metadata describing the viewing event (see 1203 in FIG. 12), regardless of whether the privacy value associated with the viewing event is high or low. According to other exemplary embodiments, the generation of the metadata in 1203 may be controlled or adjusted, based on the privacy value determined in 1202. For example, if the determination module 202 determines that the privacy value associated with the viewing event is "low" (indicating that the user has a low inferred sensitivity to the publication of the viewing event), then the metadata management module 204 may generate metadata that includes identification information that identifies the user and/or viewing reason information that indicates how the viewing user came across that particular portion of content, how the user was notified of the content, how the content came to the user's attention, etc. Examples of identification information are name, username, screen name, telephone number, e-mail address, street address, etc. Examples of metadata generated by the metadata management module 204 that describes such viewing events are the metadata portions 1301-1304 in FIG. 13. On the other hand, if the determination module 202 determines that the privacy value associated with a viewing event is "high", the metadata management module 204 may refrain from including the identification information and/or the view reason information in metadata describing the viewing event. An example of metadata generated by the metadata management module 204 that describes such a viewing event is the metadata portion 1600 in FIG. 16, which does not include identification information of the user and does not include a view reason.

Figure 17:
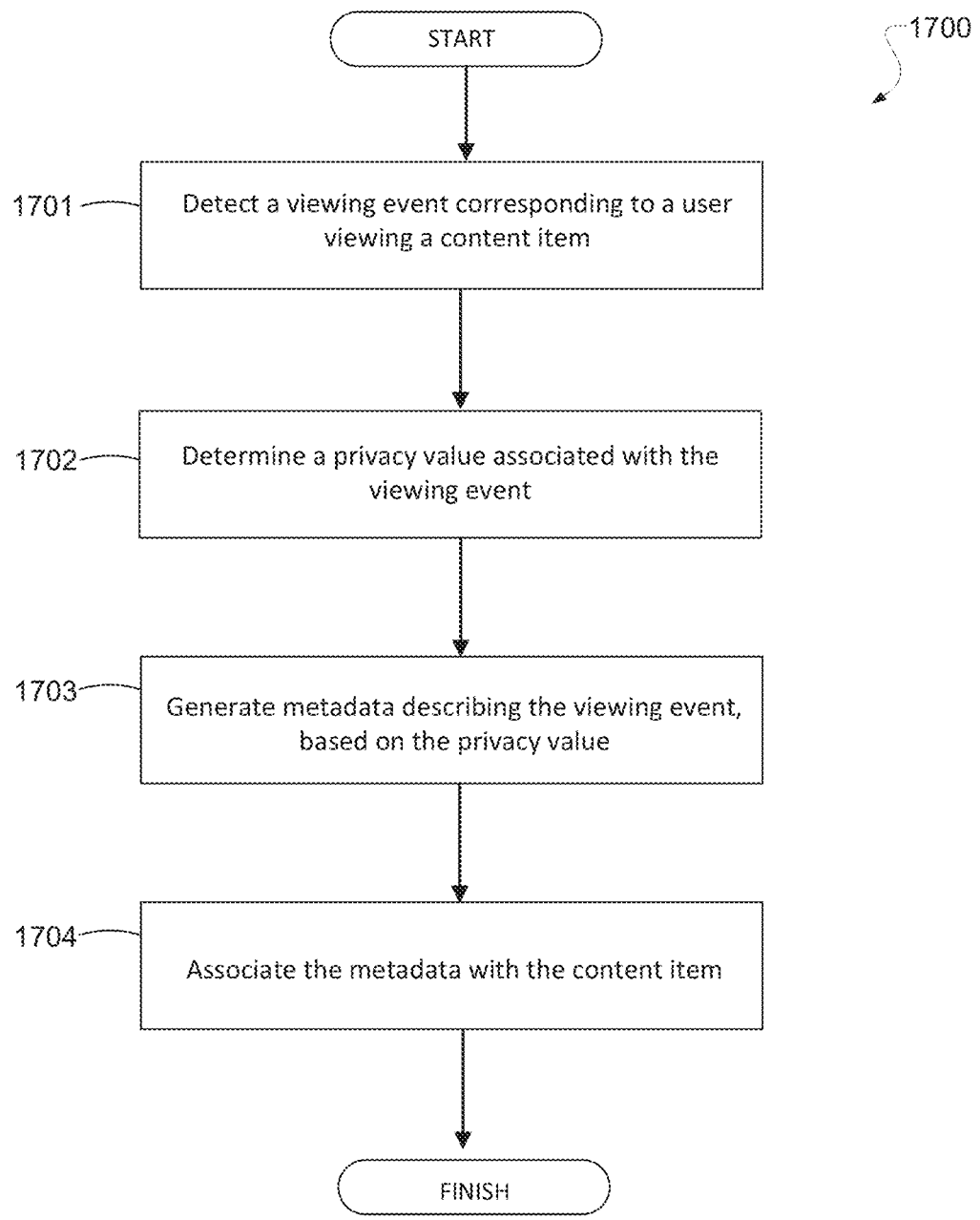
FIG. 17 is a flowchart illustrating an example method, according to various embodiments.

FIG. 17 is a flowchart illustrating an example method 1700, according to various embodiments described above. The method 1700 may be performed at least in part by, for example, the viewer publication system 200 illustrated in FIG. 2. 1701 and 1702 are similar to 301 and 302 in the method 300 illustrated in FIG. 3. For example, in 1701, the determination module 202 detects a viewing event corresponding to a user viewing a content item, and in 1702, the determination module 202 determines a privacy value associated with the viewing event that was detected in 1701. The privacy value may indicate an inferred sensitivity of the user to publication of the viewing event that was detected in 1701. In 1703, the metadata management module 204 generates metadata describing the viewing event, based on the privacy value determined in 1702. In other words, the generation of the metadata may be controlled or adjusted based on the privacy value determined in 1702. In 1704, the metadata management module 204 associates the metadata generated in 1703 with the content item that was viewed in 1701. After 1704, the metadata management module 204 may also display a views page (e.g., views page 1500 illustrated in FIG. 15), consistent with various embodiments described above. For example, if a metadata management module 204 encounters a metadata portion with an anonymous user (e.g., the metadata portion 1600 illustrated in FIG. 16), the metadata management module 204 will include an anonymous user listing in a views page, such as the user listing 1502 in the views page 1500.

Figure 18:
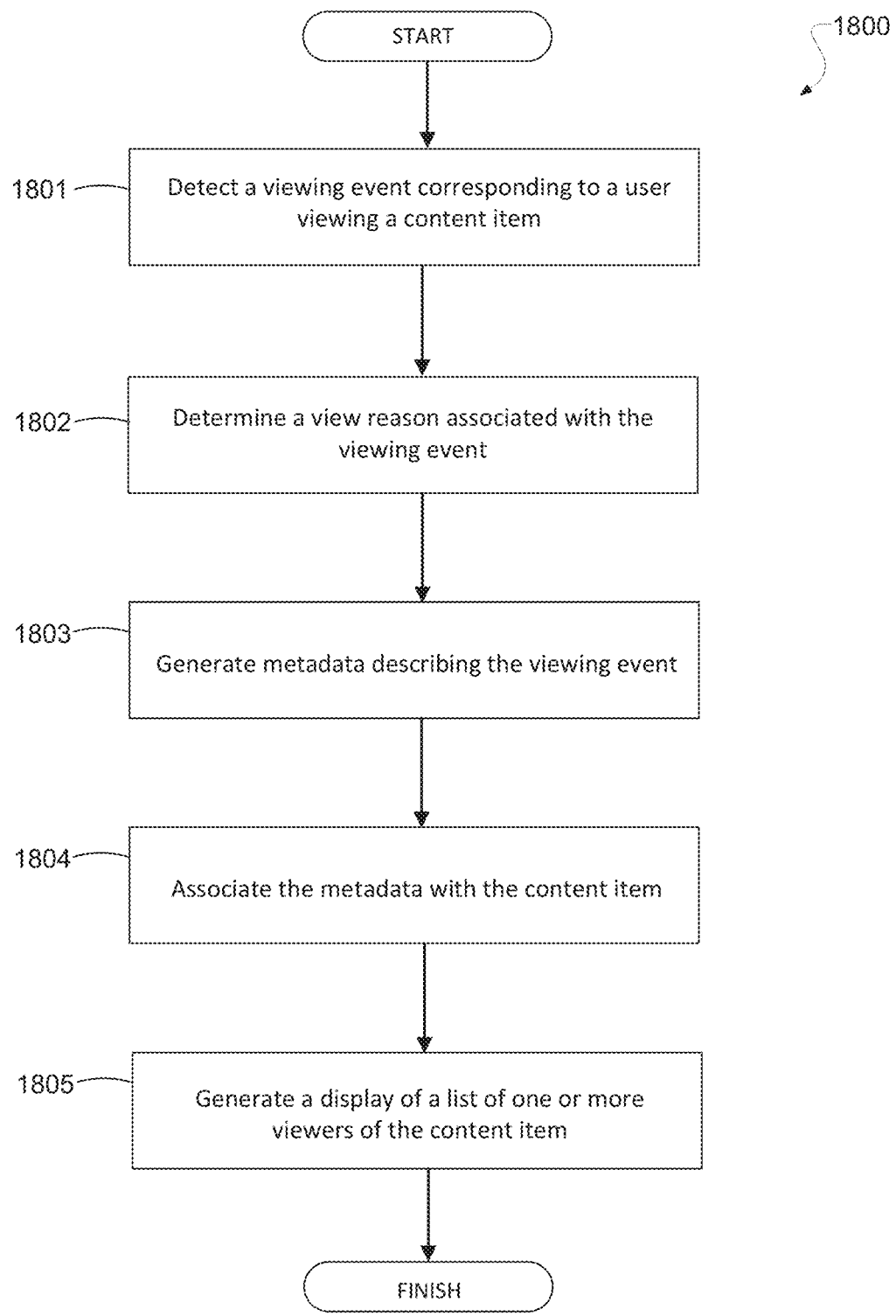
FIG. 18 is a flowchart illustrating an example method, according to various embodiments.

FIG. 18 is a flowchart illustrating an example method 1800, according to various embodiments. The method 1800 may be performed at least in part by, for example, the viewer publication system 200 illustrated in FIG. 2 (or an apparatus having similar modules, such as client machines 110 and 112 or application server 112 illustrated in FIG. 1). In 1801, the determination module 202 detects a viewing event corresponding to a user viewing a content item. In 1802, the determination module 202 determines a view reason (or generates view reason information) associated with the viewing event. As described in various embodiments throughout, the "view reason" or "view reason information" identifies how the user was notified of the content item, how the user accessed the viewed content item, how the content item came to the user's attention, etc. Examples of different types of view reason information, and how such view reason information is generated, is described in more detail elsewhere in this disclosure. As one example, the view reason information may identify another person followed by or connected to the user, if the user became aware of the content or was led to the content "via" the other person. As another example, the view reason information may identify a topic followed by or connected to the user, if the user became aware of the content or was led to the content "via" the topic (e.g., "via Sailing" or "via Cars"). As another example, the view reason information may identify a content distribution channel via which the user is notified of the content item (e.g., "via Weekly Digest", "via Notification", "via E-mail", "via Content Feed", etc.). As another example, if the content item was viewed by the user while the user took some public action with respect to the content item (e.g., posting the content item, posting a response to the content item, following the content item, or voting on the content item, etc.), then the view reason information may identify the content itself (e.g., "via the Question"). As another example, the view reason may correspond to "via Direct URL Entry" if the user accessed the content item by entering the URL for the content item directly into an address location bar of a web browser. As another example, the view reason may correspond to "via Browsing Links" if the user accessed the content item by selecting a link in a webpage (e.g., other than one of the public webpages listed in the privacy policy information 1100), which may include miscellaneous browsing through various webpages and links (e.g., clicking on the related questions 406 in FIG. 4). As another example, the view reason may correspond to "via Search Results" where the user accessed the content item by entering a search query into a search bar (e.g., a search bar of the question-and-answer service 10) and clicking on one of the search results in a search results page.

In 1803 in FIG. 18, the metadata management module 204 generates metadata describing the viewing event that was detected in 1801. The metadata generated in 1803 may include the view reason information determined in 1802. Examples of metadata describing viewing events and including view reason information associated with each of the viewing events is illustrated in FIGS. 13 and 14. According to various exemplary embodiments described elsewhere in this disclosure, the metadata management module 204 may also generate privacy values associated with the viewing events, and include such privacy values in the metadata. According to various other exemplary embodiments, the metadata management module 204 need not generate privacy values, and the metadata generated by the metadata management module 204 in 1803 need not include privacy values. In 1804, the metadata management module 204 associates the metadata generated in 1803 with the content item that was viewed in 1801.

In 1805, the metadata management module 204 generates a display, via a user interface in a device (such as the client computer 20 illustrated in FIG. 1), of a views page with a list of one or more viewers of a content item, based on metadata associated with views of the content item, such as the metadata generated in 1803. The views page may also describe how the identified viewers came upon that particular content item. An example of a "views page" indicating a list of one or more viewers of the content item and associated view reasons is illustrated in FIG. 15. According to an exemplary embodiment, the views page may include a list of all the viewers (and associated view reasons) of the content item.

According to another exemplary embodiment, some of the viewers and/or view reasons may be anonymized or eliminated from the views page, based on the view reason information included in the metadata describing the viewing event. For example, the metadata management module 204 may access a set of rules or policies indicating that viewing events associated with specific types of view reasons should be fully identified in the views page (such as views page 1500 illustrated in FIG. 15), whereas viewing events with other specific types of view reasons should be removed from the views page (or have anonymous viewers listed). According to various exemplary embodiments, the operation 1805 in the method 1800 is optional.

According to various exemplary embodiments, the metadata management module 204 is configured to display a viewership summary page. For example, each content author of the question-and-answer service 10 may generate one or more questions, by, for example posting question pages such as the question page 400 illustrated in FIG. 4. Accordingly, the metadata management module 204 may display a page summarizing all the viewers of all the question pages hosted by a single content author. For example, FIG. 19 illustrates a viewership summary page 1900 that identifies all the viewers that have viewed the various content items authored by a particular content author. As illustrated in FIG. 19, the viewership summary page 1900 may organize the viewers based on the timing of the view (such as, for example, in the past week 1901 or the past month 1902). For each viewer, the viewership summary identifies the content item viewed by the viewer, and view reason information describing how the viewer was notified of the specific content item or how the viewer accessed the specific content item. The generation of view reason information is described elsewhere in this disclosure.

Figure 20:
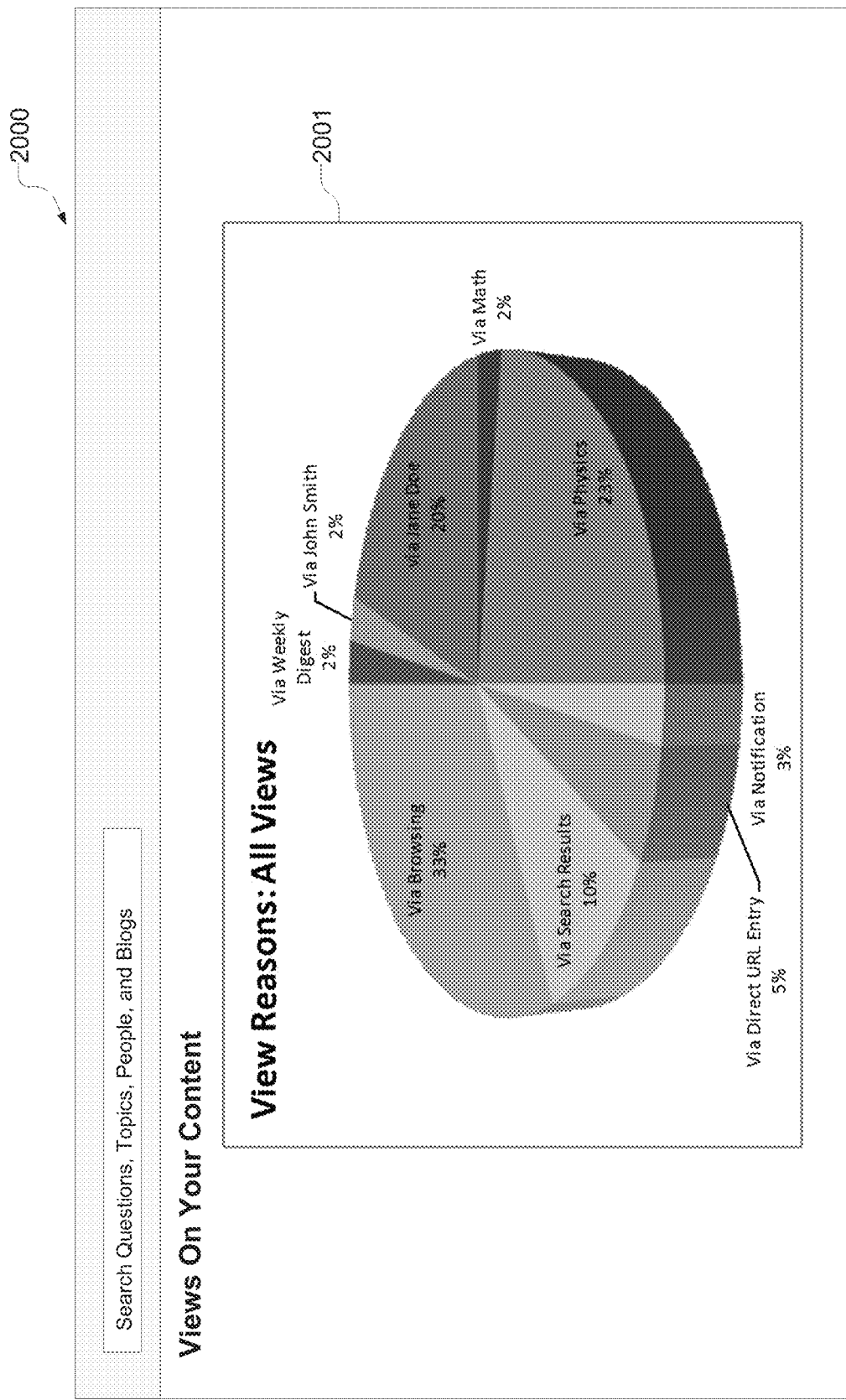
FIG. 20 illustrates an exemplary portion of a user interface that displays a viewership summary, according to various embodiments.

According to various exemplary embodiments, the viewership summary page 1900 can also display other types of statistical information, demographic information, or analytic information based on the view reason information included in the metadata describing each viewing event (e.g., see metadata portions in FIGS. 13 and 14). For example, FIG. 20 illustrates another example of a viewership summary page 2000 displaying a chart 2001 that illustrates the percentage of all of the views of a particular content author's content that can be attributed to a particular view reason. For example, as seen in the chart 2001, it can be seen that a large percentage of views came from the topic of Physics, in comparison to a relatively small percentage of views that came via the topic of Math. Similarly, it can be seen that a relatively large percentage of views came via the user Jane Doe, in comparison to a relatively small percentage of views that came via the user John Smith. Similarly, it can be seen that a relatively large percentage of views came via 'Browsing", in comparison to a smaller percentage of views that came "via Search Results", and an even smaller percentage of views that came via "Direct URL Entry", and so forth.

Figure 21:
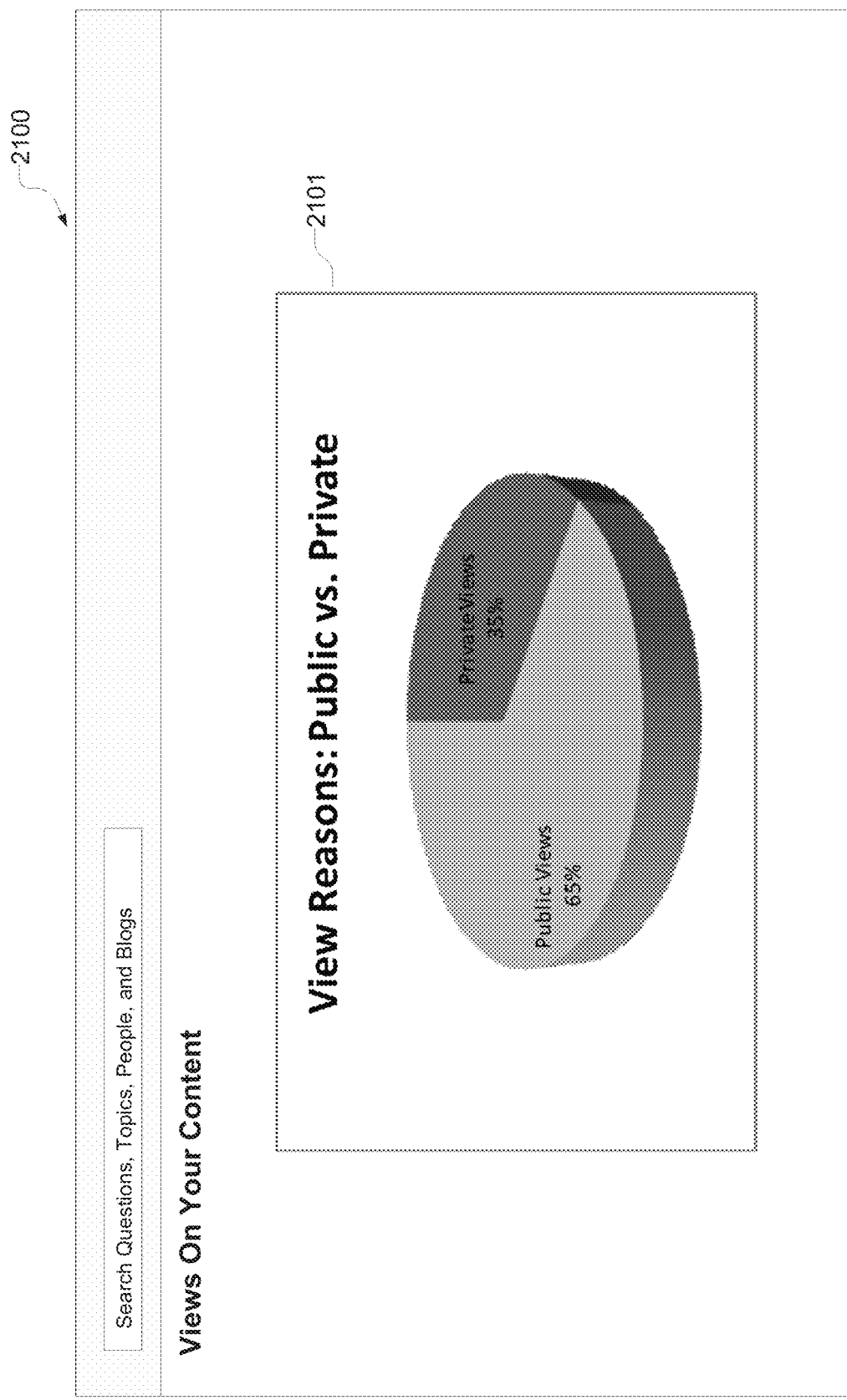
FIG. 21 illustrates an exemplary portion of a user interface that displays a viewership summary, according to various embodiments.
Figure 22:
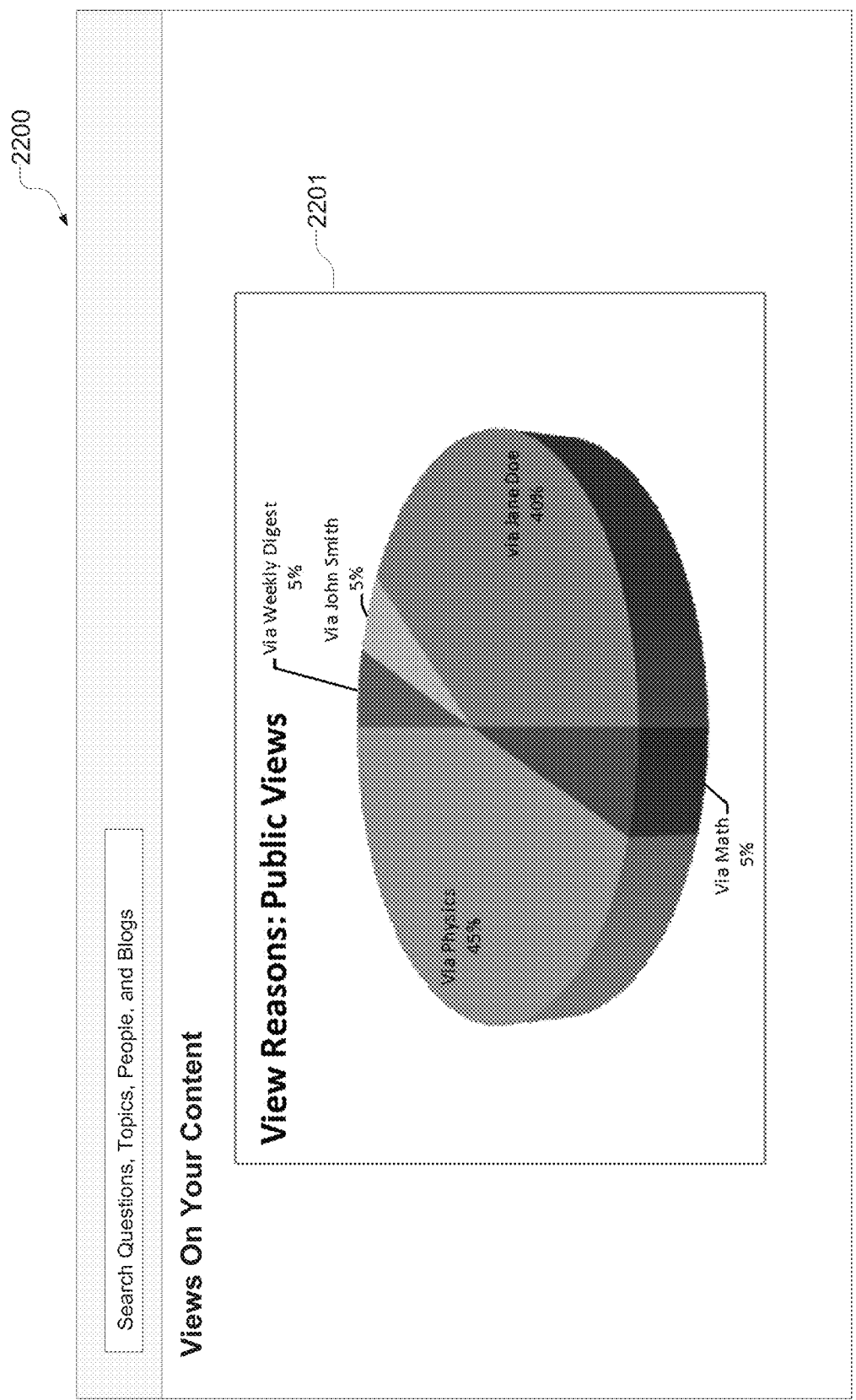
FIG. 22 illustrates an exemplary portion of a user interface that displays a viewership summary, according to various embodiments.
Figure 23:
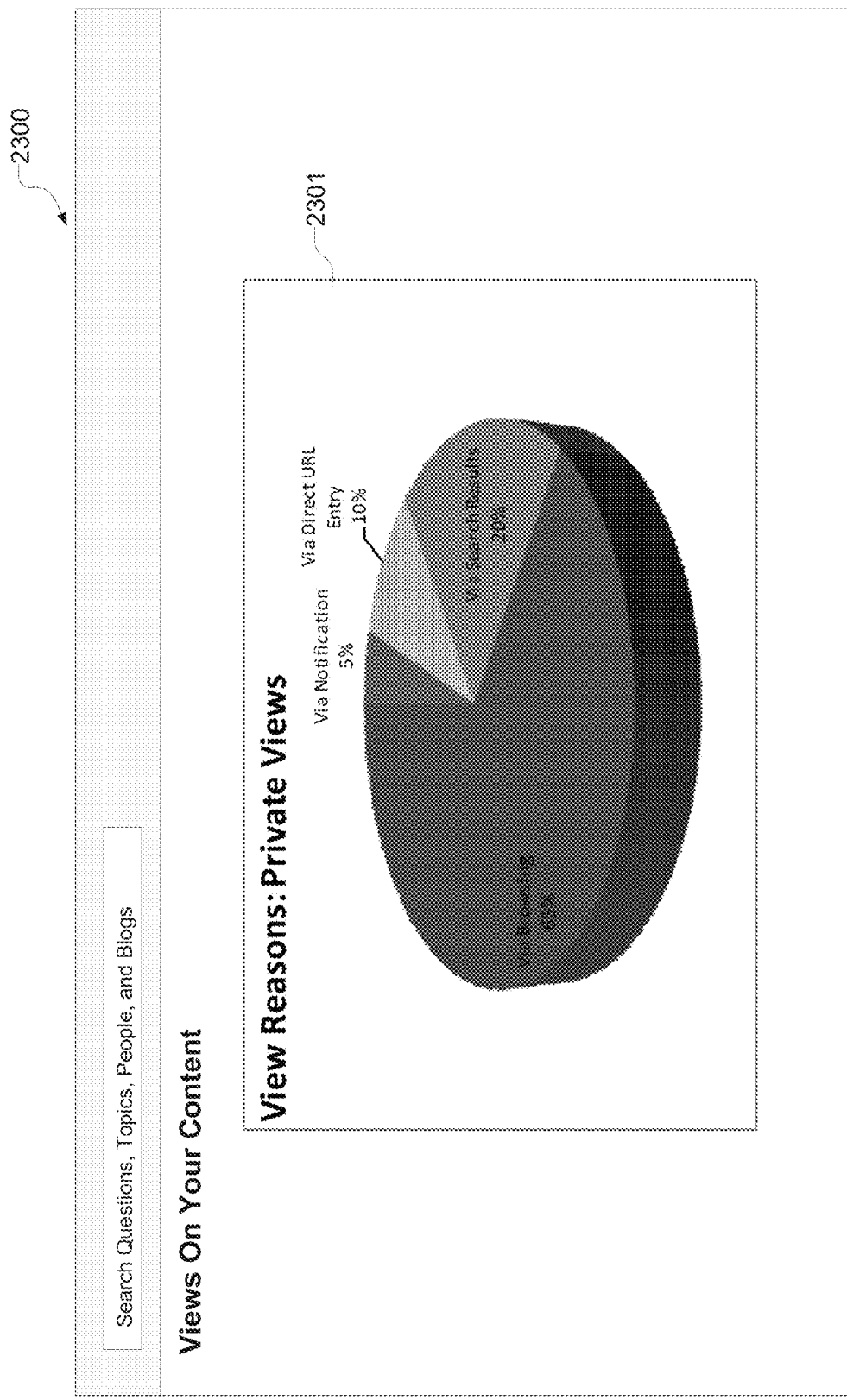
FIG. 23 illustrates an exemplary portion of a user interface that displays a viewership summary, according to various embodiments.

Moreover, FIG. 21 illustrates another example of a viewership summary page 2100 that includes a chart 2101 illustrating the percentage of all the views of a particular content author's content that can be attributed to public views or private views (e.g., view events associated with low privacy values or high privacy values, as described elsewhere in this disclosure). Moreover, FIG. 22 illustrates another example of a viewership summary page 2200 that includes a chart 2201 illustrating the percentage of all of the public views of a particular content author's content that can be attributed to a particular view reason. Moreover, FIG. 23 illustrates another example of a viewership summary page 2300 that includes a chart 2301 illustrating the percentage of all of the private views of a particular content author's content that can be attributed to a particular view reason.

Moreover, while the viewership summary pages depicted in FIGS. 19 through 23 illustrate information regarding all the views of a single content author's content, the viewer publication system 200 of this disclosure can generate similar viewership summary pages based on (a) views for content associated with a set of one or more authors/owners/users (e.g., a set of authors/owners/users having a common demographic or biographic characteristic), (b) views for content associated with one or more specific topics, (c) views for content associated with one or more specific keywords, (d) views for a single piece of content, or any combination thereof, etc.

Thus, based on the statistical and analytic data included in the various viewership summaries described herein, users can better understand how various viewers are being led to various content items. For example, specific users or topics can be identified as "hubs" or "channels" within an information network or knowledge repository (such as the question-and-answer service 10), if many viewers are viewing a particular type of content "via" these users or topics. This provides content authors with valuable information for generating and promoting content. For example, content can be generated, promoted, and targeted at specific topics or specific users, in order to maximize the number of viewers of the content, or in order to reach specific kinds of viewers, etc.

Figure 24:
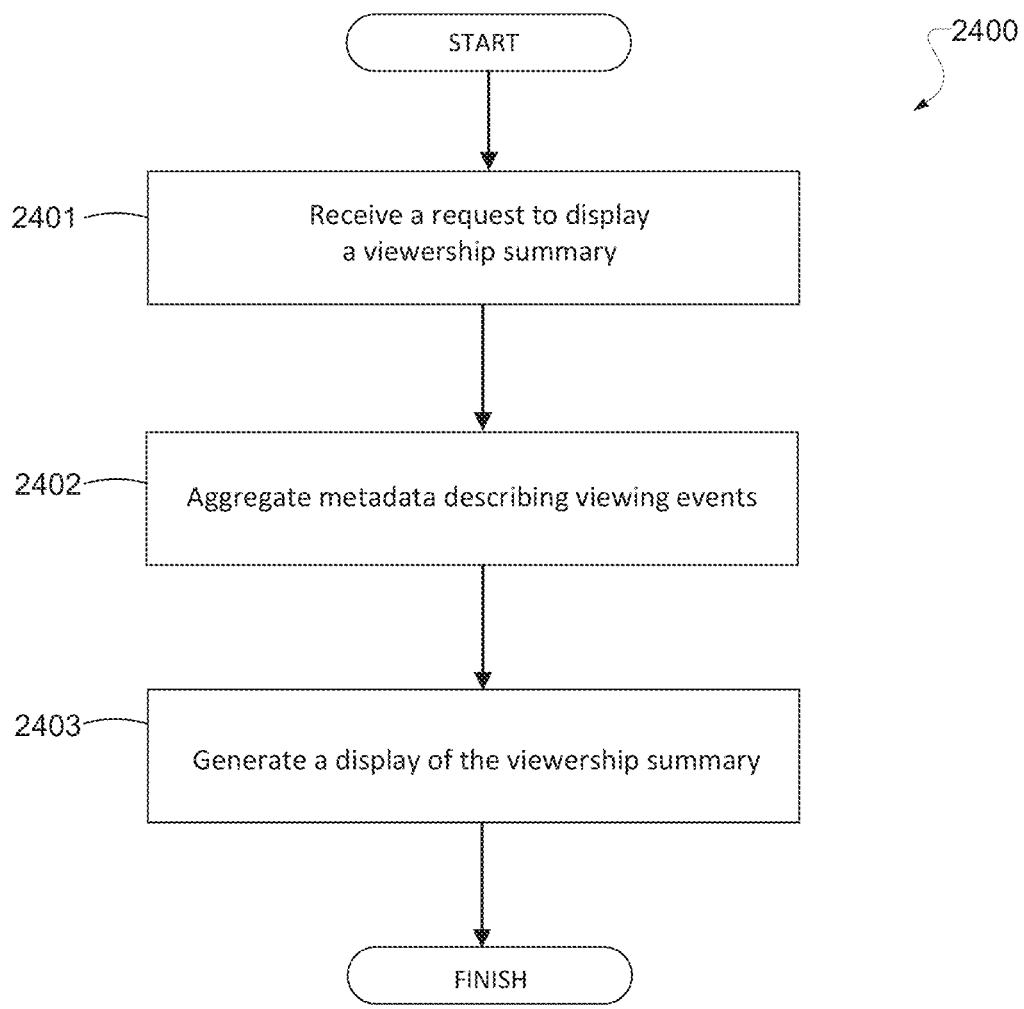
FIG. 24 is a flowchart illustrating an example method, according to various embodiments.

FIG. 24 is a flowchart illustrating an example method 2400, according to various embodiments described above. The method 2400 may be performed at least in part by, for example, the viewer publication system 200 illustrated in FIG. 2. In 2401, the metadata management module 204 receives a request to display a viewership summary for a set of one or more content items. For example, the set may include content associated with one or more specific authors/owners/users, content associated with one or more specific topics, content associated with one or more specific keywords, a single piece of content, and so on. In 2402, the metadata management module 204 aggregates metadata describing viewing events associated with the aforementioned set of content items. For example, the metadata management module 204 may access a list (e.g., from the user profile data 38 in database 34 or user-generated content 42 in the database 34 in FIG. 1) of all content items associated with one or more specific authors/owners/users, all content items associated with one or more specific topics, all content items associated with one or more specific keywords, a single piece of content, and so on. Thereafter, the metadata management module 204 accesses all metadata describing viewing events associated with the appropriate content items. As one example, the metadata management module 204 may access all metadata portions (see FIG. 12 and FIG. 13) where the "content item" field matches one of the appropriate content items.

In 2403, the metadata management module 204 generates a display, via a user interface in a device (such as the client computer 20 illustrated in FIG. 1), of the viewership summary, based on the metadata aggregated in 2402. Examples of viewership summary pages are illustrated in FIGS. 19 to 23. The metadata management module 204 may also filter the information included in the viewership summary, based on the time of each view. For example, as illustrated in FIG. 19, different portions of the viewership summary may be generated based on metadata portions (see FIG. 13 and FIG. 14) having a viewing date/time field that falls within a predetermined time interval.

While various embodiments of this disclosure describe content items posted on a question-and-answer service (such as question content items, answer content items, content feeds, profile pages, topics, and so on), it is understood that the techniques described in various embodiments are not limited to such exemplary content items. For example, the techniques described in various embodiments throughout are applicable to various types of online and offline content including webpages, websites, blogs, bulletin boards, discussion forums, posts, reviews, articles, publications, presentations, profile pages, news feeds, content feeds, etc., where such content items may be distributed or disseminated in any online or offline format, via any online or offline distribution or delivery channel including electronic communications such as e-mails, text messages (such as short message service (SMS) text messages or multimedia messaging service (MMS) text messages), instant messages, chat messages, video chat messages, video conferencing, and so on.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 25:
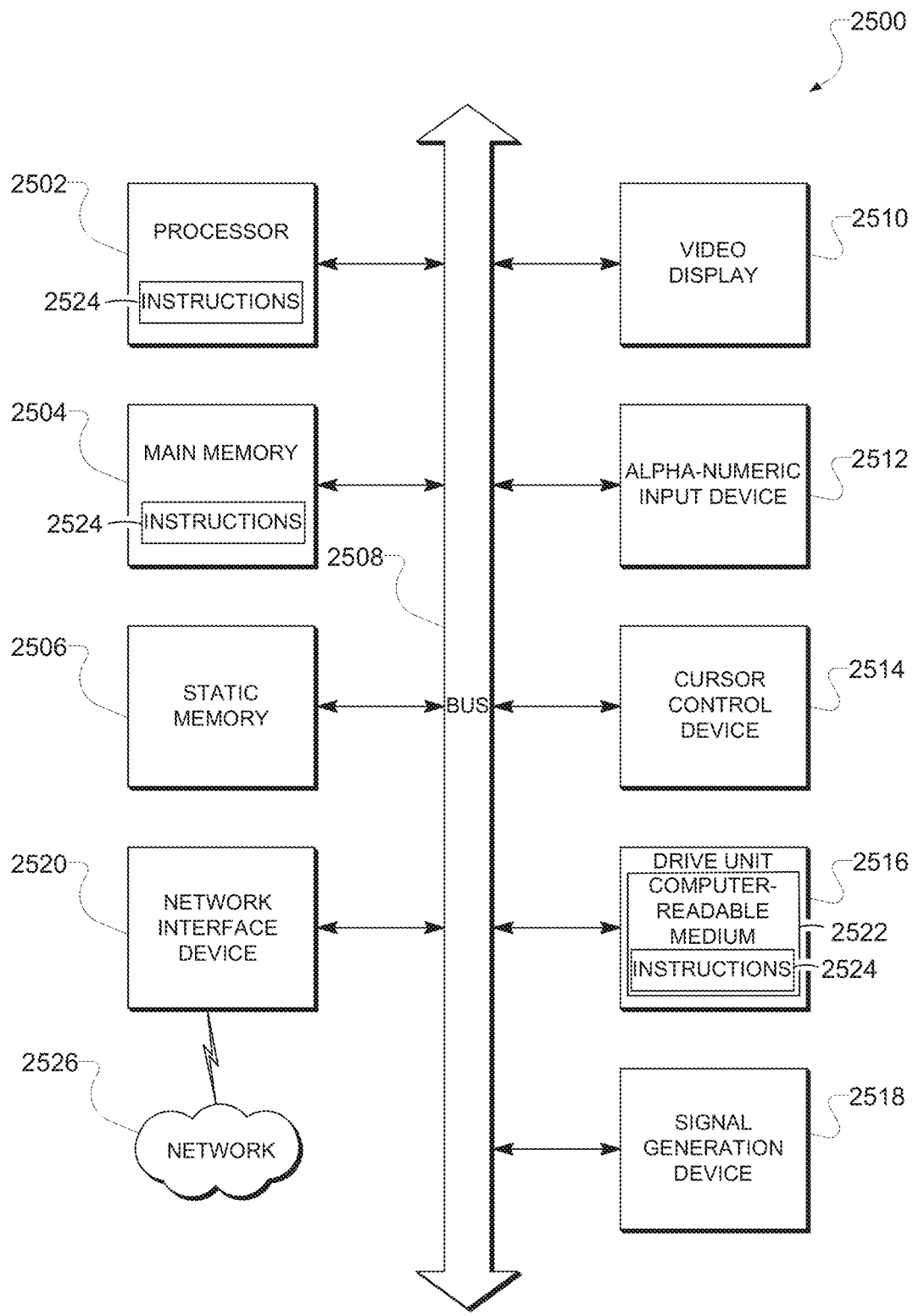
FIG. 25 is a diagrammatic representation of a machine in the example form of a computer system within which a set of instructions, for causing the machine to perform any one or more of the methodologies discussed herein, may be executed.

FIG. 25 is a block diagram of machine in the example form of a computer system 2500 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2500 includes a processor 2502 (e.g., a central processing unit (CPU), a graphics processing unit (GPU) or both), a main memory 2504 and a static memory 2506, which communicate with each other via a bus 2508. The computer system 2500 may further include a video display unit 2510 (e.g., a liquid crystal display (LCD) or a cathode ray tube (CRT)). The computer system 2500 also includes an alphanumeric input device 2512 (e.g., a keyboard or a touch-sensitive display screen), a user interface (UI) navigation device 2514 (e.g., a mouse), a disk drive unit 2516, a signal generation device 2518 (e.g., a speaker) and a network interface device 2520.

Machine-Readable Medium

The disk drive unit 2516 includes a machine-readable medium 2522 on which is stored one or more sets of instructions and data structures (e.g., software) 2524 embodying or utilized by any one or more of the methodologies or functions described herein. The instructions 2524 may also reside, completely or at least partially, within the main memory 2504 and/or within the processor 2502 during execution thereof by the computer system 2500, the main memory 2504 and the processor 2502 also constituting machine-readable media.

While the machine-readable medium 2522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 2524 may further be transmitted or received over a communications network 2526 using a transmission medium. The instructions 2524 may be transmitted using the network interface device 2520 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   detecting a viewing event corresponding to a user viewing a content item;
   determining, using one or more processors, a view reason associated with the viewing event, the view reason indicating how the user was notified of the content item or how the user accessed the content item;
   generating, using the one or more processors, metadata describing the viewing event;
   associating the metadata with the content item;
   receiving a request, from a content author, to display a viewership summary of content items authored by the content author;
   aggregating metadata describing viewing events associated with the content items authored by the content author; and generating a display, via a user interface in a device, of the viewership summary, based on the aggregated metadata, the viewership summary indicating a list of one or more viewers that have viewed one or more of the content items authored by the content author within a predetermined time period, and the list identifying, for each of the viewers, a specific one of the content items viewed by the viewer, and a view reason indicating how the viewer was notified of the specific content item or how the viewer accessed the specific content item.

2. The method of claim 1, wherein the generating comprises:
including, in the metadata, the view reason information.

3. The method of claim 1, wherein the view reason identifies a content distribution channel via which the user was notified of the content item.

4. The method of claim 1, wherein the view reason identifies a person followed by or connected to the user, after a content feed notifies the user of an interaction between the person and the content item.

5. The method of claim 1, wherein the view reason identifies a topic followed by or connected to the user, after a content feed notifies the user of an association between the content item and the topic and notifies the user of an update to the content item.

6. The method of claim 1, wherein the view reason identifies the content item, after a public interaction event between the user and the content item, the interaction event corresponding to the user posting the content item, posting a response to the content item, following the content item, or voting on the content item.

7. The method of claim 1, wherein the view reason indicates that the user specified a reference link to the content item in an address bar of a web browser application.

8. The method of claim 1, wherein the view reason indicates that the user accessed the content item via a reference link included in another content item.

9. The method of claim 1, wherein the view reason indicates that the user accessed the content item via a reference link associated with a search result displayed in a search results webpage.

10. The method of claim 1, further comprising:
generating a display, via a user interface in a device, of a list of one or more viewers of the content item, based on the metadata associated with the content item.

11. The method of claim 1, wherein the list identifies, for each of the viewers, identification information of the viewer, and a view reason indicating how the viewer was notified of the content item or how the viewer accessed the content item.

12. The method of claim 1, further comprising determining a privacy value associated with the viewing event, the privacy value indicating an inferred sensitivity of the user to publication of the viewing event.

13. The method of claim 12, wherein the privacy value is determined based on content included in the content item or a topic associated with the content item.

14. The method of claim 12, wherein the privacy value is determined based on a content distribution channel via which the user is notified of the content item, the content distribution channel providing a reference link that was accessed by the user to view the content item.

15. The method of claim 12, wherein the privacy value is determined based on a previous content item viewed by the user before the user viewed the content item, the previous content item including a reference link that was accessed by the user to view the content item.

16. The method of claim 12, wherein the privacy value is determined based on a public interaction event between the user and the content item, the interaction event corresponding to the user posting the content item, posting a response to the content item, following the content item, or voting on the content item.

17. A non-transitory machine-readable storage medium having embodied thereon instructions executable by one or more machines to perform operations comprising:
detecting a viewing event corresponding to a user viewing a content item;
determining view reason information associated with the viewing event, the view reason information indicating how the user was notified of the content item or how the user accessed the content item;
generating metadata describing the viewing event;
associating the metadata with the content item;
receiving a request, from a content author, to display a viewership summary of content items authored by the content author;
aggregating metadata describing viewing events associated with the content items authored by the content author; and
generating a display, via a user interface in a device, of the viewership summary, based on the aggregated metadata, the viewership summary indicating a list of one or more viewers that have viewed one or more of the content items authored by the content author within a predetermined time period, and the list identifying, for each of the viewers, a specific one of the content items viewed by the viewer, and a view reason indicating how the viewer was notified of the specific content item or how the viewer accessed the specific content item.

18. A system comprising:
a determination module configured to:
detect a viewing event corresponding to a user viewing a content item; and
determine view reason information associated with the viewing event, the view reason information indicating how the user was notified of the content item or how the user accessed the content item; and
a metadata management module configured to:
generate metadata describing the viewing event;
associate the metadata with the content item;
receive a request, from a content author, to display a viewership summary of content items authored by the content author;
aggregate metadata describing viewing events associated with the content items authored by the content author; and
generate a display, via a user interface in a device, of the viewership summary, based on the aggregated metadata, the viewership summary indicating a list of one or more viewers that have viewed one or more of the content items authored by the content author within a predetermined time period, and the list identifying, for each of the viewers, a specific one of the content items viewed by the viewer, and a view reason indicating how the viewer was notified of the specific content item or how the viewer accessed the specific content item.

* * * * *